(12) United States Patent
Hayashi et al.

(10) Patent No.: US 8,090,745 B2
(45) Date of Patent: Jan. 3, 2012

(54) K-NEAREST NEIGHBOR SEARCH METHOD, K-NEAREST NEIGHBOR SEARCH PROGRAM, AND K-NEAREST NEIGHBOR SEARCH DEVICE

(75) Inventors: Hideki Hayashi, Kodaira (JP); Daisuke Ito, Fuchu (JP); Masaaki Tanizaki, Nishitokyo (JP); Kouji Kimura, Fujisawa (JP); Hisanori Kajiyama, Yokohama (JP)

(73) Assignees: Hitachi, Ltd., Tokyo (JP); Hitachi Solutions, Ltd., Tokyo (JP)

( * ) Notice: Subject to any disclaimer, the term of this patent is extended or adjusted under 35 U.S.C. 154(b) by 540 days.

(21) Appl. No.: 12/362,962

(22) Filed: Jan. 30, 2009

(65) Prior Publication Data

US 2009/0210413 A1 Aug. 20, 2009

(30) Foreign Application Priority Data

Feb. 19, 2008 (JP) ................................. 2008-037362

(51) Int. Cl.
*G06F 17/30* (2006.01)
(52) U.S. Cl. ....................................................... 707/797
(58) Field of Classification Search ................... 707/797
See application file for complete search history.

(56) References Cited

U.S. PATENT DOCUMENTS

| | | | |
|---|---|---|---|
| 6,137,493 A * | 10/2000 | Kamimura et al. | 345/423 |
| 6,834,278 B2 * | 12/2004 | Yu et al. | 707/737 |
| 6,879,980 B1 * | 4/2005 | Kothuri et al. | 707/765 |
| 7,007,019 B2 * | 2/2006 | Kanno | 707/999.003 |
| 7,080,065 B1 * | 7/2006 | Kothuri et al. | 707/999.003 |
| 7,167,856 B2 * | 1/2007 | Lawder | 707/999.003 |
| 7,181,467 B2 * | 2/2007 | Kothuri | 707/999.003 |
| 7,185,023 B2 * | 2/2007 | Kothuri | 707/999.104 |
| 7,216,129 B2 * | 5/2007 | Aono et al. | 707/999.006 |
| 7,219,108 B2 * | 5/2007 | Kothuri et al. | 707/754 |

(Continued)

FOREIGN PATENT DOCUMENTS

JP 2003-242151 8/2003

OTHER PUBLICATIONS

Raptopoulou et al., Fast Nearest-Neighbor Query Processing in Moving-Object Databases, 2003, Kluwer Academic Publishers, pp. 113-137.*

(Continued)

*Primary Examiner* — James Trujillo
*Assistant Examiner* — Jorge A Casanova
(74) *Attorney, Agent, or Firm* — Brundidge & Stanger, P.C.

(57) ABSTRACT

Provided is a k-nearest neighbor search method of searching for a query number k of nearest points to an arbitrary point in a DBMS for creating a spatial index from multidimensional points, comprising setting a search conditions, judging which of a lowest branch and an intermediate branch of the spatial index a nearest region to the query point is, calculating, when the nearest region is judged to be the lowest branch, a distance between the query point and a child region of the nearest region, storing information of a divided region which has become a calculation target, calculating, when the nearest region is judged to be the intermediate region, a distance between the query point and a point included in the nearest region, storing information of the point which has become a calculation target, finishing search processing when the search conditions are satisfied, and obtaining a search result from the DBMS.

31 Claims, 27 Drawing Sheets

U.S. PATENT DOCUMENTS

| | | | | |
|---|---|---|---|---|
| 7,239,989 | B2* | 7/2007 | Kothuri | 707/999.002 |
| 7,379,936 | B2* | 5/2008 | Kothuri et al. | 707/999.003 |
| 7,428,541 | B2* | 9/2008 | Houle | 707/999.003 |
| 7,644,105 | B2* | 1/2010 | Huang et al. | 707/791 |
| 7,899,230 | B2* | 3/2011 | Azar et al. | 382/128 |
| 2002/0123987 | A1* | 9/2002 | Cox | 707/3 |
| 2008/0016037 | A1 | 1/2008 | Enomoto et al. | |
| 2010/0169323 | A1* | 7/2010 | Liu et al. | 707/748 |

OTHER PUBLICATIONS

Geng et al., Query Dependent Ranking Using K-Nearest Neighbor, Jul. 20-24, 2008, SIGIR'08, pp. 115-121.*

Nutanong et al., The V*-Diagram: A Query-Dependent Approach to Moving KNN Queries, Aug. 23-28, 2008, ACM, pp. 1095-1106.*

Iwerks et al., Continuous K-Nearest Neighbor Queries for Continuosly Moving Points with Updates, 2003, Proceedings of the 29th VLDB Conference, pp. 1-12.*

Yu et al., Monitoring k-Nearest Queries Over Moving Objects, 2005, IEEE, pp. 1-12.*

"Nearest Neighbor Queries", by Nick Roussopoulos, et al. Date: 1995.

"Distance Browsing in Spatial Databases" by G. Hjaltason, et al. Date: Jun. 1999.

"High-Demensional Data", pp. 548-550.

* cited by examiner

| | ATTRIBUTE | | VALUE (INTERMEDIATE BRANCH) | VALUE (LOWEST BRANCH) |
|---|---|---|---|---|
| 411 | ATTRIBUTE | | VALUE (INTERMEDIATE BRANCH) | VALUE (LOWEST BRANCH) |
| 412 | REGION ID | | i | j |
| 413 | RANGE | BOTTOM-LEFT COORDINATE | (Xmin, Ymin) | (Xmin, Ymin) |
| | | TOP-RIGHT COORDINATE | (Xmax, Ymax) | (Xmax, Ymax) |
| 414 | DIVIDED POINT | | (Xdiv, Ydiv) | NULL |
| 415 | CHILD REGION ID | BOTTOM LEFT | k | NULL |
| | | BOTTOM RIGHT | l | NULL |
| | | TOP LEFT | m | NULL |
| | | TOP RIGHT | n | NULL |
| 416 | POINTER TO CHILD REGION | BOTTOM LEFT | $Ptr_k$ | NULL |
| | | BOTTOM RIGHT | $Ptr_l$ | NULL |
| | | TOP LEFT | $Ptr_m$ | NULL |
| | | TOP RIGHT | $Ptr_n$ | NULL |
| 417 | POINTER TO LEAF NODE | | NULL | LeafPtr |
| 418 | NUMBER OF POINTS | | 0 | n |

*FIG. 4*

| ATTRIBUTE | | | VALUE | |
|---|---|---|---|---|
| POINT INFORMATION | POINT 1 | POINT ID | $S_1$ | 511 |
| | | COORDINATE | $(x_1, y_1)$ | 512 |
| | | POINTER | $RowPtr_1$ | 513 |
| | POINT 2 | POINT ID | $S_2$ | |
| | | COORDINATE | $(x_2, y_2)$ | |
| | | POINTER | $RowPtr_2$ | |
| | ... | ... | ... | |
| | POINT n | POINT ID | $S_n$ | |
| | | COORDINATE | $(x_n, y_n)$ | |
| | | POINTER | $RowPtr_n$ | |

| ATTRIBUTE | | | VALUE | |
|---|---|---|---|---|
| POINT INFORMATION | POINT 1 | POINT ID | $S_1$ | 511 |
| | | COORDINATE | $(x_1, y_1)$ | 512 |
| | | TYPE | $T_1$ | 514 |
| | | POINTER | $RowPtr_1$ | 513 |
| | POINT 2 | POINT ID | $S_2$ | |
| | | COORDINATE | $(x_2, y_2)$ | |
| | | TYPE | $T_2$ | |
| | | POINTER | $RowPtr_2$ | |
| | ... | ... | ... | |
| | POINT n | POINT ID | $S_n$ | |
| | | COORDINATE | $(x_n, y_n)$ | |
| | | TYPE | $T_n$ | |
| | | POINTER | $RowPtr_n$ | |

SQL USABLE ONLY IN FIRST EMBODIMENT ⌐2701

```
SELECT   *
FROM     TABLE NAME
WHERE    kNN(COORDINATE COLUMN NAME, QUERY POINT, QUERY NUMBER) = 'TRUE'
```

FIG. 27A

SQL USABLE IN FIRST AND SECOND EMBODIMENTS ⌐2702

```
SELECT   *
FROM     TABLE NAME
WHERE    kNN(COORDINATE COLUMN NAME, QUERY POINT, QUERY NUMBER, TYPE) = 'TRUE'
```

FIG. 27B

SQL USABLE IN FIRST AND THIRD EMBODIMENTS ⌐2703

```
SELECT   *
FROM     TABLE NAME
WHERE    kNN(COORDINATE COLUMN NAME, QUERY POINT, QUERY NUMBER,
             QUERY DISTANCE) = 'TRUE'
```

FIG. 27C

SQL USABLE IN FIRST, SECOND, AND THIRD EMBODIMENTS ⌐2704

```
SELECT   *
FROM     TABLE NAME
WHERE    kNN(COORDINATE COLUMN NAME, QUERY POINT, QUERY NUMBER,
             TYPE, QUERY DISTANCE) = 'TRUE'
```

FIG. 27D

K-NEAREST NEIGHBOR SEARCH METHOD, K-NEAREST NEIGHBOR SEARCH PROGRAM, AND K-NEAREST NEIGHBOR SEARCH DEVICE

CLAIM OF PRIORITY

The present application claims priority from Japanese patent application JP2008-37362 filed on Feb. 19, 2008, the content of which is hereby incorporated by reference into this application.

BACKGROUND OF THE INVENTION

This invention relates to a k-nearest neighbor search technique for strictly searching arbitrary multidimensional points for k nearest points at high speed, and more particularly, to a technique for searching for points in a two-dimensional or three-dimensional space assuming map information management.

A database management system that has a spatial search function has been developed for the purpose of map information management. This database management system is referred to as a spatial database management system. The spatial database management system enables management of graphic elements such as points, lines or surfaces of objects, and attribute elements such as characters or numerical values indicating contents of the objects. The spatial search function realizes range search for obtaining objects included or in contact with an arbitrary range. To achieve a high speed of range search, a spatial index technique such as quadtree, grid file, or R-tree has been proposed. The spatial index technique divides a spatial region according to arrangement and distribution of objects in the space area.

The spatial database management system has conventionally been developed for enterprise applications. Recently, however, a spatial database management system has been developed also for application to an embedded device. The embedded device that needs the spatial database is a device such as a car navigation device or a personal navigation device (PND) for managing map information. The car navigation device has a function of searching a spatial database for points such as restaurants or parking lots near a given point such as a current location or a destination designated by a user. For that purpose, k-nearest neighbor search for obtaining a number k (hereinafter referred to as a query number) of nearest points to the user-designated point (hereinafter referred to as a query point) from the spatial database has been known.

The k-nearest neighbor search in the conventional spatial database management system is realized by using range search. According to the conventional k-nearest neighbor search, first, a search range of an arbitrary size around a query point is set. If the number of points included in the search range exceeds the query number, distances between the query point and the respective points are calculated. The points are sorted in order of increasing distances, and k nearest points are obtained as the search result. On the other hand, if the number of points included in the search range is less than the query number, until the number exceeds the query number, a larger search range is set to repeat the range search. For example, a method that uses range search based on a grid file (JP 2003-242151 A) and a method that uses range search based on quadtree (U.S. Pat. No. 6,879,980) have been known.

SUMMARY OF THE INVENTION

However, the application of the conventional technique to the embedded device has had the following problems.

A first problem is extension of search time caused by disk access and a calculation load.

The embedded device generally includes a main memory of small capacity. A disk access accordingly occurs during search execution to read a page of a spatial index from an external storage device into the main memory. Thus, in the embedded device, when the number of points included in a search range is very large, disk access occurs frequently to extend search time. Especially, this problem occurs in a region with high population density of points and the search range is wide. On the other hand, an enterprise server includes a main memory of large capacity. The server can accordingly store most pages of a spatial index in the main memory beforehand. In this case, even when a large number of points are included within the search range, disk access does not occur frequently. Thus, search time is not extended.

The embedded device includes a low-speed central processing unit. Thus, a calculation load for calculation of a distance from a query point to respective points or sort processing by distance affects search time. Especially, when the number of points included in the search range is very large, the calculation load increases to extend the search time. On the other hand, the enterprise server includes a high-speed central processing unit. Thus, an influence of a calculation load on the search time is small.

It has been described that when the number of points included in the search range is very large, the problems occur in terms of disk access and calculation load. Even when the number of points included in the search range is less than the query number, problems similar to the above occur since search processing is repeated until the number of points reaches the query number.

To solve the problems, a method of setting a search range to an appropriate size based on the query number and a population density of points near the query point in the spatial database may be employed. However, this method may not be suitable for the embedded device. It is because for the embedded device, management of a population density of points has a heavy load while insertion or deletion of points may occur.

As a result, the k-nearest neighbor search using a range search in the embedded device has a problem of extended search time.

A second problem is inhibition of executing search processing or extension of search time when a capacity of memory usage is large during search execution.

According to the conventional technique, all points included in the search range are stored in the main memory, and sorted by using distances from the query point. Thus, when a large number of points are included within the search range, a capacity of memory usage increases. In this case, it may not be possible to implement the conventional technique since the embedded device includes a main memory of small capacity.

To solve this problem, there is a method in which an external storage device stores points that a main memory can not store. In this method, however, a disk access occurs in sort processing of points, and then, the search time increases.

A third problem is a possibility of an inaccurate search result with the number of points less than k when conventional k-nearest neighbor search and attribute search are combined.

The k-nearest neighbor search and the attribute search are executed in combination for a table which includes many types of points. For example, a point table managed by a car navigation device includes a restaurant, a parking lot, and a gas station. When a type is a restaurant, the point table includes a detailed classification such as Japanese food, Italian food, or French food. In this case, a user sets, in addition to a query point and the query number, a point type to execute k-nearest neighbor search. In a normal spatial database, attribute information and point information are managed as different attributes in the table. Thus, in a where-phrase of Structured Query Language (SQL), conditions of k-nearest neighbor search and attribute search are coupled together by an AND operator.

In this case, even when a number of points equal to the query number is obtained in k-nearest neighbor search, the number of points may be less than the query number. It is because a product set is obtained from a set of points obtained in k-nearest neighbor search and a set of points obtained in attribute search.

To solve the problem, a database management system for enterprise employs a method of setting the query number greater than k. In the embedded device, however, this method is not suitable. It is because when the query number is large, the number of necessary pages of a spatial index increases, and in the embedded device which includes the main memory of small capacity, disk access occurs frequently to extend search time. On the other hand, the enterprise server includes the main memory of large capacity. Thus, storing pages of the spatial index in the main memory beforehand can prevent frequent disk access even when the query number is large.

A fourth problem is extension of search time when k nearest points are not near a given query point.

In the conventional k-nearest neighbor search, the search range is widened until the query number is reached. When there is no desired point near the query point, a search result may include a point several tens of kilometers away from the query point. As the search range is widened, the number of necessary pages of the spatial index is increased. Thus, as described above, the search time is extended in the embedded device which includes the main memory of small capacity.

This invention has been developed with the aforementioned problems in mind, and achieves to reduce a capacity of memory usage during search processing and to shorten search time in a spatial database.

According to this invention, a k-nearest neighbor search method of receiving a query point which becomes a search start point and searching for a query number k of nearest points to the query point in a database including multidimensional points and a spatial index where a region including the points is divided into a plurality of regions to set child regions in the region, and a tree structure including branches and leaf nodes is created from the points and the region, and a database management system for managing the database, the method comprising: setting the query point and the query number as search conditions; judging which of a lowest branch and an intermediate branch of the spatial index a nearest region to the query point is; calculating, when the nearest region is judged to be the intermediate branch having a child region, a distance between the query point and the child region of the nearest region as a region distance; storing information on a region which has become a calculation target of the region distance to obtain a nearest region to the region; calculating, when a result of the judging which of the lowest branch and the intermediate branch shows that the nearest region is the lowest branch having no child region, a distance between the query point and a point included in the nearest region as a point distance; storing information on the point which has become a calculation target of the point distance; repeating, until the search conditions are satisfied, search processing from the judging which of the lowest branch and the intermediate branch of the spatial index the nearest region to the query point is to the storing the information on the point which has become the calculation target of the point distance, and finishing the search processing when the search conditions are satisfied; and obtaining, after the finishing the search processing, a record of the stored point as a search result from the database management system.

This invention enables reduction of the number of disk accesses to pages of a spatial index compared to that in the conventional k-nearest neighbor search using the range search. Thus, search time can be reduced. Reducing points targeted for distance calculation or sort processing can lower a calculation load of a processor. Moreover, a capacity of memory usage during search execution can be reduced.

BRIEF DESCRIPTION OF THE DRAWINGS

FIG. 4 illustrates the divided region table 401 stored beforehand in the spatial index according to the first embodiment of this invention.

FIG. 5 illustrates the point table 501 stored beforehand in the spatial index according to the first embodiment of this invention.

FIG. 21 illustrates an example of a point table for information on a leaf node of a quadtree according to a first embodiment of this invention.

FIG. 27A illustrates the fourth embodiment, illustrating a SQL description example for k-nearest neighbor search realized by the first embodiment.

FIG. 27B illustrates the fourth embodiment, illustrating a SQL description example for k-nearest neighbor search realized by the first and the second embodiments.

FIG. 27C illustrates the fourth embodiment, illustrating a SQL description example for k-nearest neighbor search realized by the first and the third embodiments.

FIG. 27D illustrates the fourth embodiment, illustrating a SQL description example for k-nearest neighbor search realized by the first to the third embodiments.

DETAILED DESCRIPTION OF THE PREFERRED EMBODIMENTS

Referring to the accompanying drawings, the preferred embodiments of this invention will be described.

First Embodiment

Figure 1:
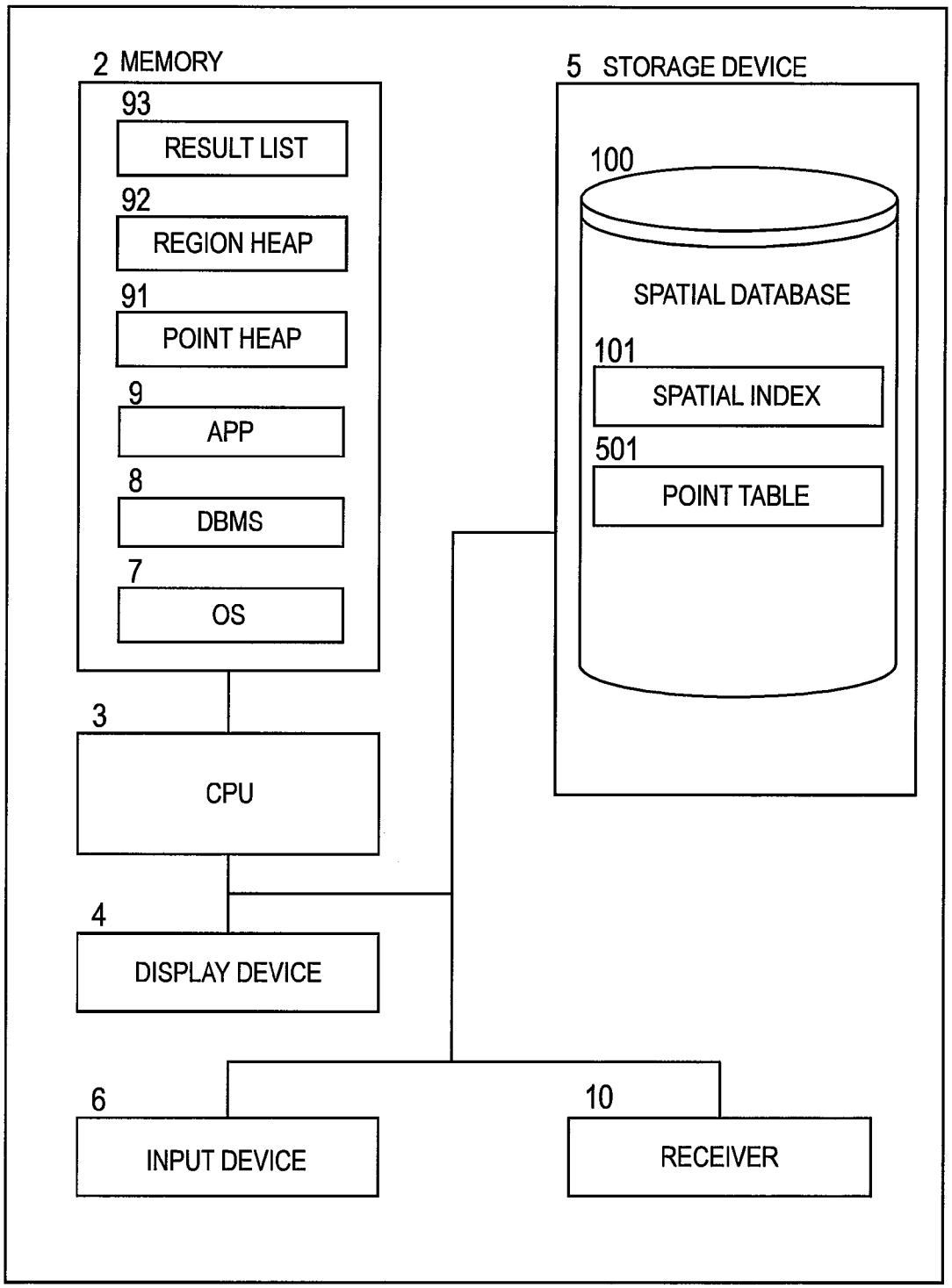
FIG. 1 is a block diagram illustrating an example of a car navigation device according to a first embodiment of this invention.

FIG. 1 is a block diagram illustrating an example of a car navigation device according to a first embodiment of this invention. A car navigation device 1 includes a CPU (Central Processing Unit) 3 for executing calculation processing, a memory 2 for temporarily storing data or programs, a storage device 5 for storing data or programs, an display device 4 for outputting a calculation result, an input device 6 for receiving an entry from a user, and a receiver 10 for receiving a signal from a GPS (Global Positioning System) satellite.

The storage device 5 stores a spatial database 100 which includes graphic elements such as points, lines or surfaces of map objects, and attribute elements such as characters or numerical values indicating contents of the objects. Among information stored in the spatial database 100, information of one spot such as a shop or facility is a point.

In the memory 2, a DBMS (Database Management System) 8 for managing the spatial database 100, an application 9 for using the spatial database 100 via the DBMS 8, and an OS (Operating System) 7 for managing the DBMS 8 and the application 9 are loaded to be executed by the CPU 3. The application 9 calculates a current position from a signal of the GPS satellite received by the receiver 10, searches the spatial database 100 for a current point, and obtains map information to output it to the display device 4. In the car navigation device 1, when a user receives a search command from the input device 6, the application 9 searches the spatial database 100 via the DBMS 8 as described below, and outputs a requested search result to the display device 4. The OS 7, the DBMS 8, and the application 9 are stored in the storage device 5 which is a recording medium, and loaded in the memory 2 at the time of starting the car navigation device 1 to be executed by the CPU 3.

The application 9 allocates work areas in the memory 2. These areas are a point heap 91, a region heap 92, and a result list 93 described below.

This embodiment realizes k-nearest neighbor search which can solve the first and second problems. An application range of this invention is not basically limited by the number of dimensions of spatial data or a type of a spatial index technique. Requirements of a spatial index technique usable by this invention are as follows.

1. A spatial region is recursively divided, and branches for storing pieces of information of the divided regions are set as nodes of a tree structure.
2. A range of the branches has a hierarchical structure where it is included in a range of branches as parent nodes of the branches.
3. A divided region not subdivided has a leaf node for storing information of points included in the divided region, and the leaf node is connected to a lowest node of the tree structure.

An example where points of a two-dimensional space stored in the spatial database 100 is a search target of the car navigation device 1 and a quadtree method is applied to a spatial index technique will be described below.

The spatial database 100 illustrated in FIG. 1 includes a point table 501 for storing coordinates and attributes of points constituting map information, and a spatial index 101 for storing index information of the point table 501.

First, the spatial index 101 is created by a computer (not shown) when points are inserted into the point table 501 managed in the spatial database 100. In this embodiment, a divided region table 401 illustrated in FIG. 4 is employed as an example of the spatial index 101. The point table 501 includes, in addition to attribute information of points, point information containing X and Y coordinates in a row. For example, the point table managed by the car navigation device 1 may include attribute information such as a name, an address or a telephone number, and point information where the location is represented by X and Y coordinates of a plane rectangular coordinate system.

According to the quadtree method, insertion of points into the spatial database 100 is accompanied by division of the spatial region into four regions at a plane parallel to the X and Y axes of a two-dimensional space. Generally, in the quadtree method, the maximum number of points that can be stored in the divided region is decided, and the divided region is divided into four when the maximum number is exceeded due to insertion of points. As region dividing methods, a method of making uniform areas of divided regions after division into four regions, and a method of making the numbers of points in the divided regions after division into four as uniform as possible have been presented. The latter method is realized by, for example, dividing the region into four on barycentric coordinates of all points in the region of a division target. The k-nearest neighbor search of this invention is operable without dependence on any region dividing method. A data structure of the quadtree method will be described below. This invention is directed to k-nearest neighbor search operated on the spatial index technique, but not directed to the spatial index technique itself. Thus, this embodiment necessitates application of only a well-known method for quadtree generation or a search procedure, and detailed description thereof will be omitted.

Figure 2:
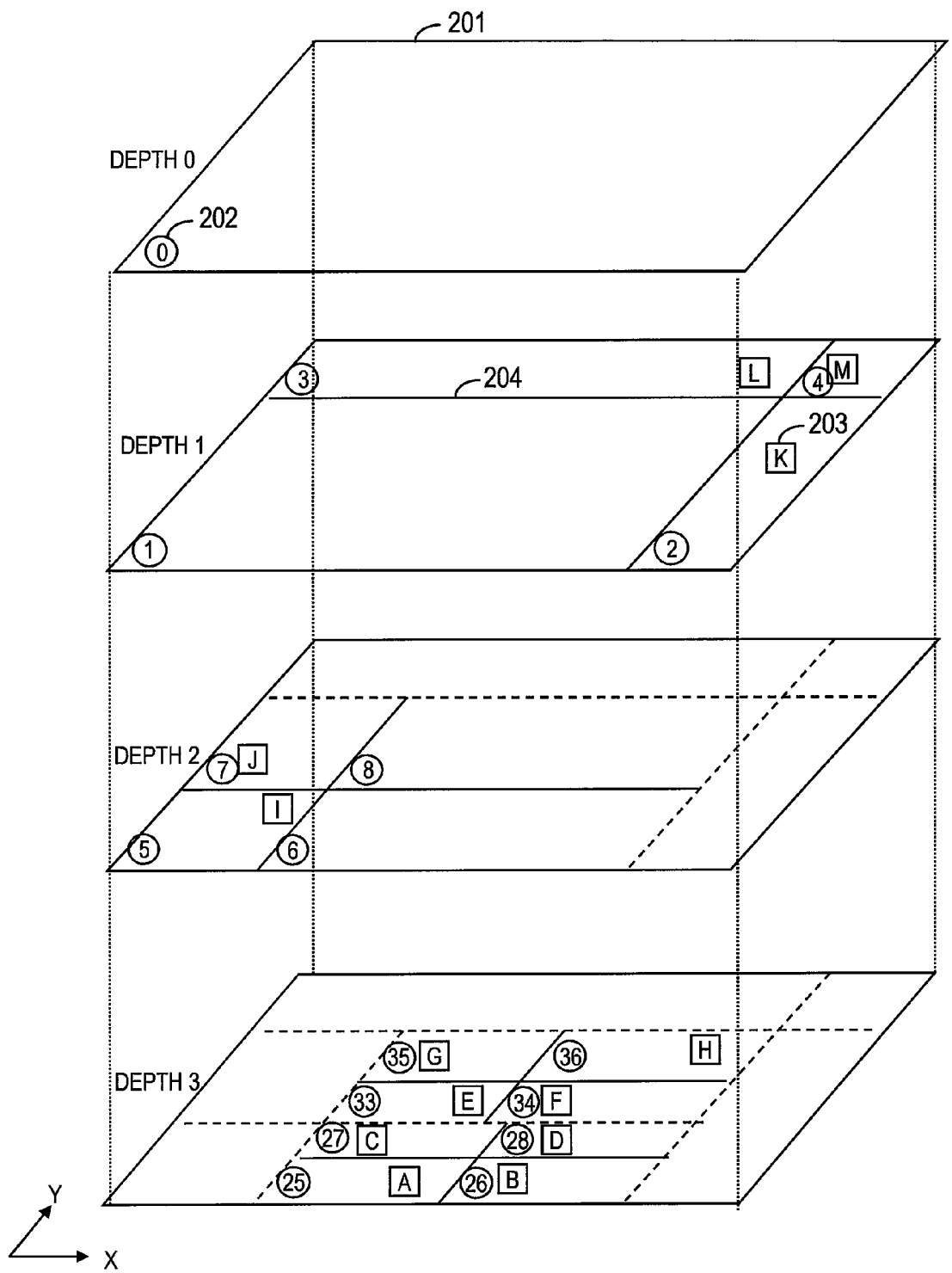
FIG. 2 illustrates a quadtree hierarchical structure indicating an example of dividing a spatial region 201 in a hierarchical manner according to a first embodiment of this invention.

FIG. 2 illustrates a quadtree hierarchical structure indicating an example of dividing a spatial region 201 in a hierarchical manner by the quadtree method for points that are locatable by one coordinate of a two-dimensional space. The spatial region 201 is divided into four by a dividing line 204. Each divided region has an identifier (region ID) 202 of a divided region. The divided region stores points 203 when the divided region is not a region to be divided into four. For example, a divided region 35 of a depth 3 stores a point G. This spatial region 201 constitutes a spatial index 101 for managing divided regions 0 to 36 hierarchically divided by a plane passing through each axis of a multidimensional space by a tree structure.

Figure 3:
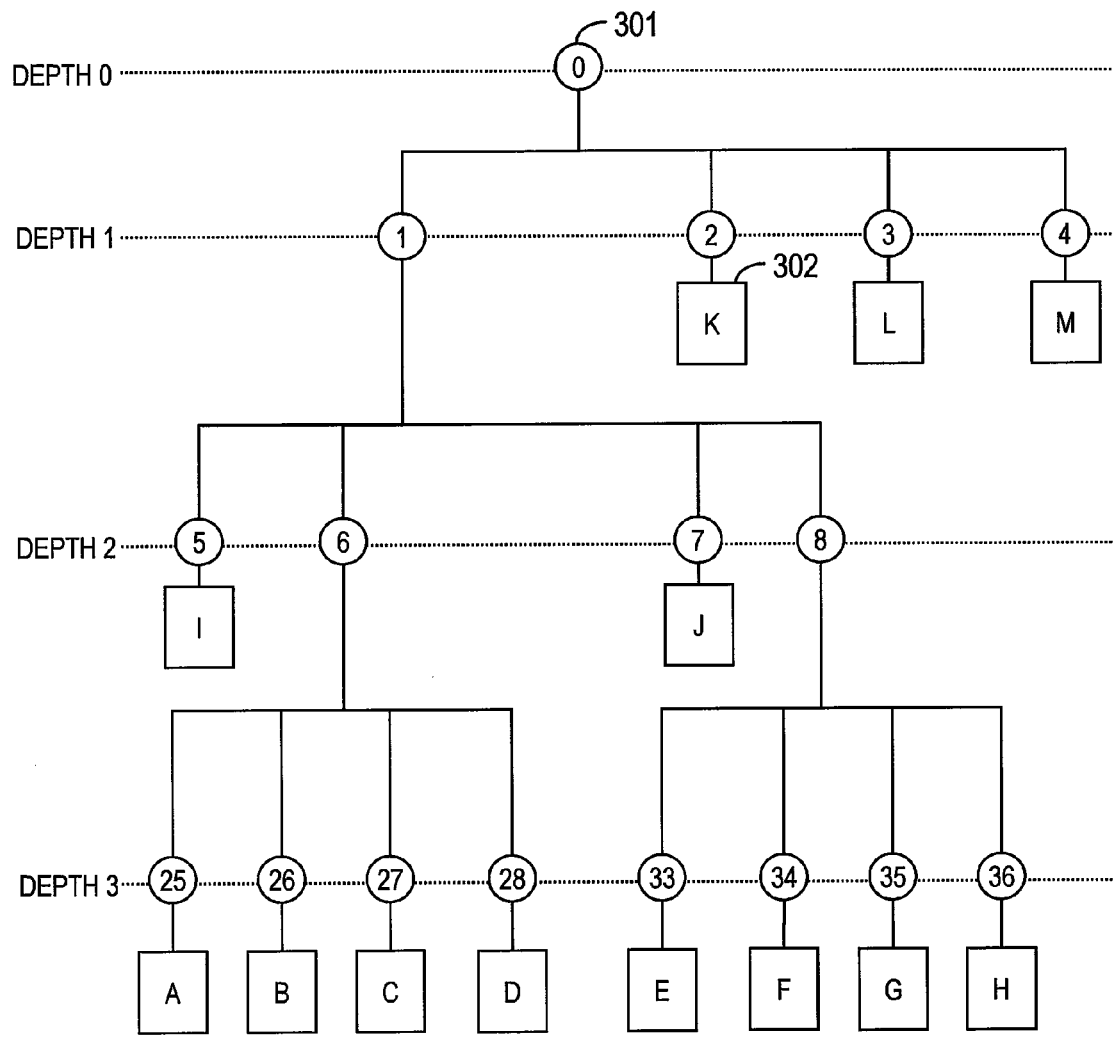
FIG. 3 illustrates a tree structure of a quadtree applied to the spatial index according to a first embodiment of this invention.

FIG. 3 illustrates a tree structure of a quadtree applied to the spatial index corresponding to the divided region of FIG. 2. In FIG. 3, it is a branch 301 (circle in the drawing) that corresponds to a node of the tree structure, and it is a leaf node 302 (square in the drawing) that is adjacent to a lowest node. The branch 301 and the divided region correspond to each other by one to one, and a numeral of the branch 301 indicates the region ID illustrated in FIG. 2. An English character in the leaf node 302 indicates an identifier (point ID). The point IDs correspond to A to M of FIG. 2. According to the quadtree method of this embodiment, the lowest branch 301 stores information of a point in the leaf node 302 adjacent to the branch.

FIG. 4 illustrates the divided region table 401 stored beforehand in the spatial index 101 of the spatial database 100. The divided region table 401 indicates information of the divided region stored in the quadtree branch 301. FIG. 4 illustrates, as an example, an attribute 411 of the divided region table 401, and values of intermediate branches (divided regions 0, 1, 6, and 8 of FIG. 3) and lowest branches (divided regions 2 to 4, 5, 7, and 25 to 36 of FIG. 3) corresponding to the attribute. The information of the divided region contains a region ID 412, a range 413, a divided point 414, a child region ID 415, a pointer to child region 416, a pointer to leaf node 417, and the number of points 418.

The region ID 412 is a unique identifier indicating a divided region. The range 413 is represented by X-Y coordinates of a bottom left and a top right of a region. The divided point 414 indicates a coordinate of a divided point when the region is divided into four. The divided region is divided into four by two straight lines passing through the divided point 414 and parallel to X and Y axes.

The child region ID 415 is an identifier of a divided region when the region is divided into four. The pointer to child region 416 indicates an address value (e.g., Logical Block Address (LBA)) of the storage device 5 which stores a branch 301 corresponding to the divided region indicated by the child region ID 415. When the branch 301 is a lowest branch, the divided region corresponding to the branch 301 has no child region. The divided point 414, the child region ID 415, and the pointer to child region 416 of the divided region corresponding to the lowest branch are NULL. The pointer to leaf node 417 indicates an address value of the storage device 5 which stores a leaf node 302 adjacent to the branch 301. The number of points 418 indicates the number of points stored in the leaf node 302 adjacent to the branch 301. When the branch 301 is an intermediate branch, the pointer to leaf node 417 of the branch 301 is NULL, and the number of points is 0.

FIG. 5 illustrates the point table 501 stored beforehand in the spatial index 101 of the spatial database 100. The point table 501 indicates information of a point stored in a quadtree leaf node 302. This point is included in a divided region corresponding to a lowest branch adjacent to the leaf node 302. Point information of each point contains a point ID 511, a coordinate 512, and a pointer 513. The point ID 511 is a unique identifier of the point. The coordinate 512 indicates a coordinate for locating the point. The pointer 513 indicates an address value of the storage device 5 which stores a record relevant to the point.

Figure 6:
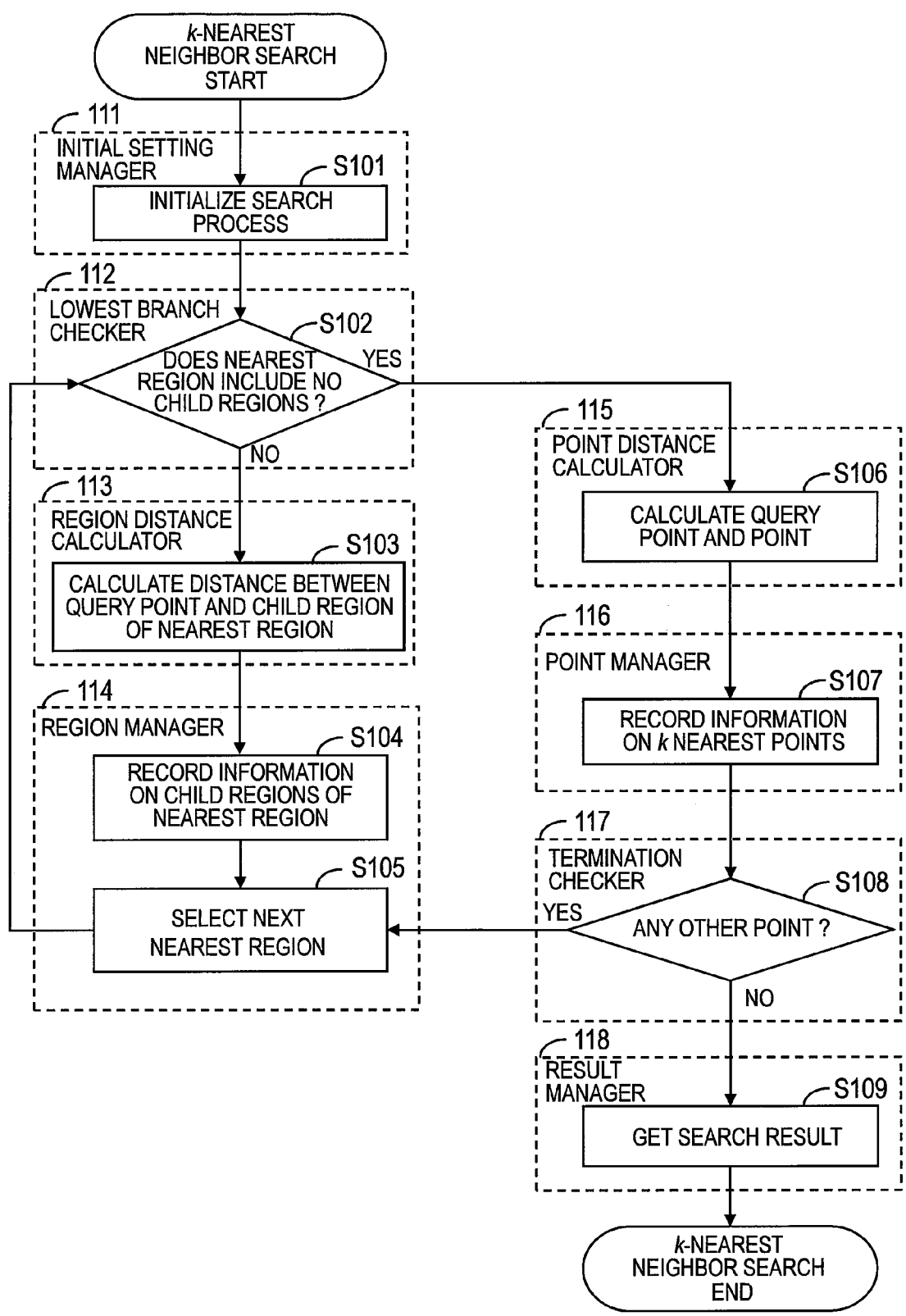
FIG. 6 is a flowchart illustrating a procedure of k-nearest neighbor search according to the first embodiment of this invention.

FIG. 6 is a flowchart illustrating a procedure of k-nearest neighbor search executed by the CPU 3 of the car navigation device 1. This processing is started when the application 9 executed by the CPU 3 receives a query point from the input device 6.

When the processing of k-nearest neighbor search is started, first, in an initial setting manager 111, the CPU 3 sets the query point or query number and allocates regions of the memory 2 to be used for a region distance calculator 113 and a point manager 116 (S101).

A lowest branch checker 112 judges whether a nearest region includes a region to be further divided into four, in other words, whether the nearest region includes any child region (S102). The nearest region is a region nearest to a query point among divided regions including a point whose entry as result candidates is yet to be checked. If the condition of Step S102 is not satisfied, the nearest region is judged not to be a lowest branch. In this case, the region distance calculator 113 calculates the shortest Euclidean distance (region distance d) between the query point and a child region of the nearest region (S103).

A region manager 114 records information of child regions with child regions of the nearest region set as regions (S104). The region indicates a divided region including a point whose entry as a result candidate is yet to be checked. Then, the region manager 114 selects a next nearest region among the regions based on the region distance d (S105).

On the other hand, if the condition of Step S102 is satisfied, a nearest region currently focused on is judged to be a lowest branch of the nearest region. In this case, a point distance calculator 115 calculates a distance (point distance d') between a query point and a point included in the nearest region (S106).

The point manager 116 records information on k nearest points near to the query point based on the obtained point distance d' (S107). A termination checker 117 judges whether a point in the region cannot be a candidate (S108). If this termination condition is not satisfied, the process proceeds to Step S105 to continue the search processing.

On the other hand, if the termination condition is satisfied, a result manager 118 obtains a result record corresponding to the point stored by the point manager 116 (S109).

The processing is continued until the termination condition is satisfied to obtain a search result from the spatial database 100.

Figure 7:
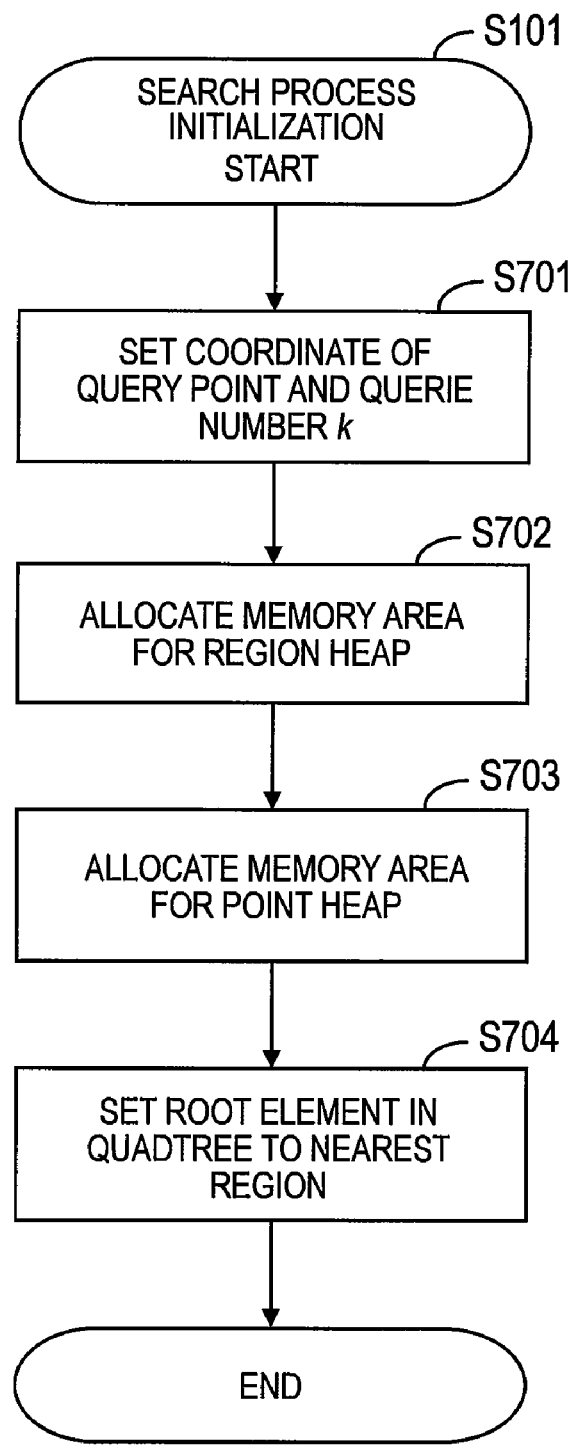
FIG. 7 is a flowchart illustrating a subroutine of a detailed procedure of setting initialization of k-nearest neighbor search according to the first embodiment of this invention.

FIG. 7 is a flowchart illustrating a subroutine of a detailed procedure of setting initialization of k-nearest neighbor search (S101: initial setting manager 111).

Setting initialization processing of FIG. 7 is executed by the initial setting manager 111 of FIG. 6. The initial setting manager 111 sets a query point and the query number as input values of k-nearest neighbor search (S701). The query point and the query number are, for example, values received from the input device 6. For the query point, a current position of a user at the time of receiving a search instruction from the input device 6 may be used.

Then, the initial setting manager 111 allocates a memory area for storing a region in a heap structure (region heap 92 hereinafter) from the memory 2 (S702). The heap structure is used because it is an efficient data structure in the insertion operation performed by the region manager 114 when it records information of the child region of the nearest region (S104) and the selection operation when the region manager 114 selects a next nearest region (S105).

The region heap 92 stores an element constituted by region ID 412, a pointer to region information, and a region distance d. The pointer to region information indicates an address value of the storage device 5 which stores a branch 301 corresponding to the region. The region distance d indicates a shortest distance from a query point to the region. The region heap 92 is managed by a tree structure. The region heap 92 satisfies a heap condition that a region distance d of each element is equal to or smaller than a region distance d of a child element of the element even if an element is inserted or deleted. In other words, a root element of the region heap 92 stores information of a divided region having a minimum region distance d.

The initial setting manager 111 allocates a memory area for storing a point by a heap structure (point heap 91 hereinafter) from the memory 2 (S703). The heap structure is used because it is an efficient data structure in the insertion operation when the point manager 116 records information on k nearest points (S107). The point heap 91 stores an element constituted by a point ID 511, a pointer 513, and a point distance d'. The point heap 91 satisfies a heap condition that a point distance d' of each element is equal to or larger than a point distance d' of a child element of the element even if an element is inserted or deleted. In other words, a root element of the point heap 91 stores information of a point having a maximum point distance d'. This feature enables, when whether k+1-th and subsequent points can be candidates is judged in a situation where k points are present, easy check only by referring to the root element. Specifically, when a point distance d' of a point of a checking target is smaller than a point distance d' of a point of the root element, the point of the checking target replaces the point of the root element as a candidate. This operation enables a reduction of a used memory capacity during search execution because only k nearest points are always stored in the memory.

The initial setting manager 111 sets a region corresponding to the root in the quadtree to a nearest region (S704), and then finish the subroutine. In this case, the nearest region becomes an overall region. Then, the process proceeds to lowest branch check of the nearest region illustrated in FIG. 6 (S102).

Figure 8:
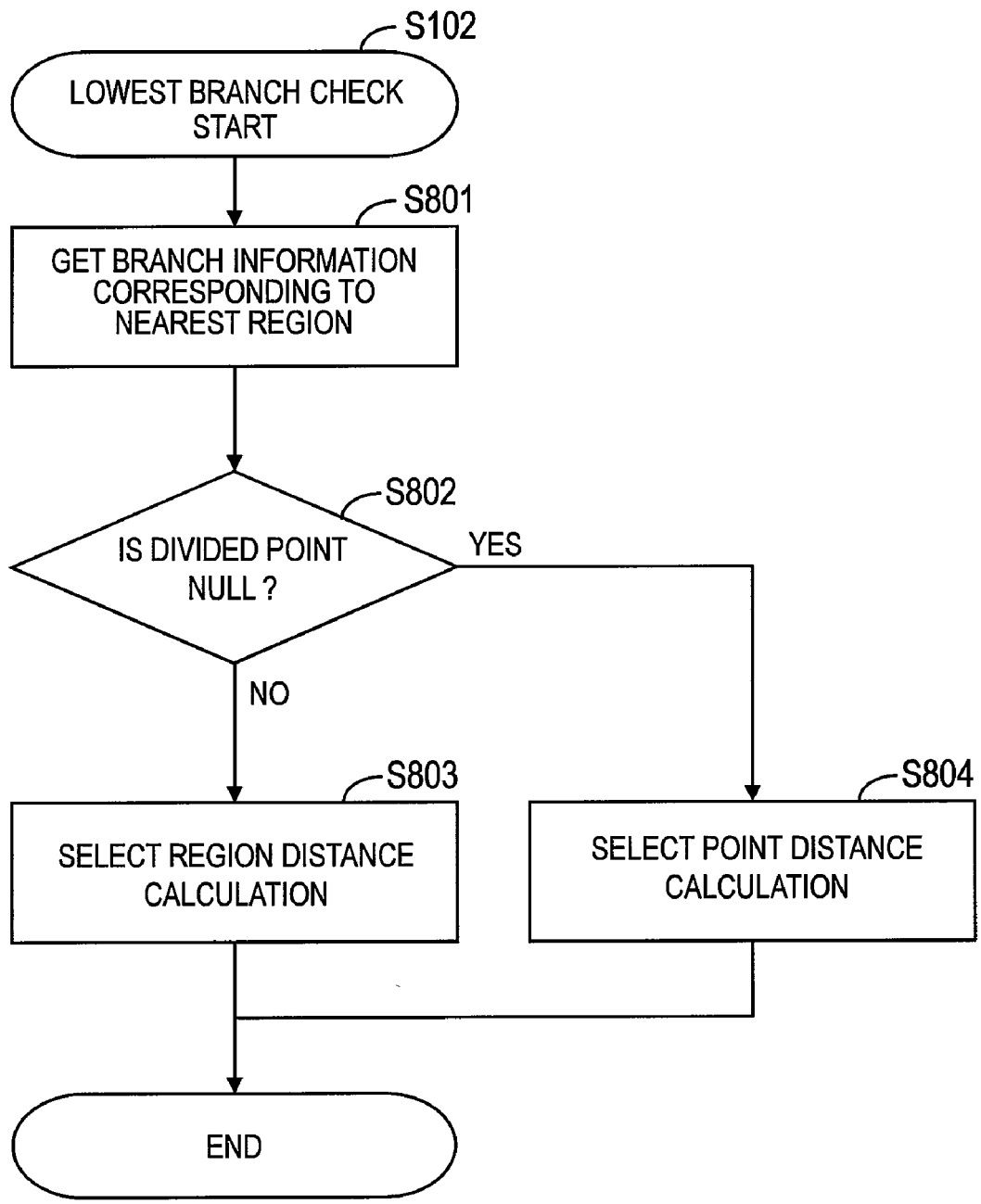
FIG. 8 is a flowchart illustrating a subroutine of a detailed procedure of the lowest branch check in the nearest region according to the first embodiment of this invention.

FIG. 8 is a flowchart illustrating a subroutine of a detailed procedure of the lowest branch check in the nearest region (S102). The lowest branch check processing is executed by the lowest branch checker 112. First, the lowest branch checker 112 obtains branch information corresponding to the nearest region decided by the initial setting manager 111 in Step S704 (S801). The branch information is stored beforehand in the spatial database 100 of the storage device 5. Referring to the divided region table 401 illustrated in FIG. 4, the lowest branch checker 112 judges whether the divided point in the branch information is NULL. This condition enables checking of whether the nearest region is a lowest branch. If the condition is not satisfied, and when the nearest region is an intermediate branch, to proceed to processing of calculating a region distance d between a query point and a child region of the nearest region (S103), the region distance calculator 113 is selected as next processing (S803). If the condition is satisfied, and when the nearest region is a lowest branch, to proceed to processing of calculating a distance between the query point and a point included in the nearest region (S106), the point distance calculator 115 is selected as next processing (S804). Then, after the end of the subroutine, the process branches to the processing selected in Step S803 or S804.

Figure 9:
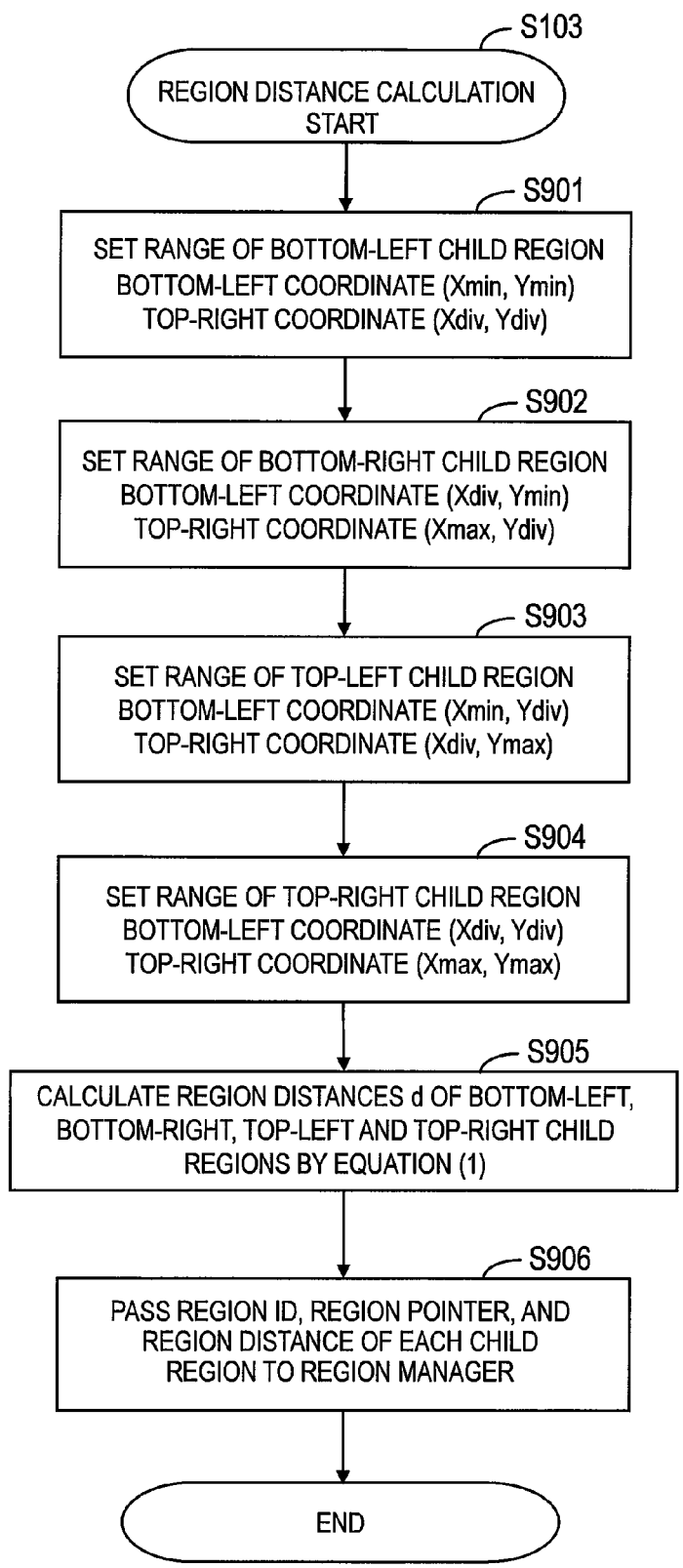
FIG. 9 is a flowchart illustrating a subroutine of a detailed procedure of the region distance calculation according to the first embodiment of this invention.

FIG. 9 is a flowchart illustrating a subroutine of a detailed procedure of the region distance calculation (S103). The region distance calculation processing is executed by the region distance calculator 113. The region distance calculator 113 calculates a region distance d between the query point and the child region of the nearest region by referring to the divided region table 401. The calculation of the region distance d needs a range of the child region. The range of the child region is obtained from a range 413 and a divided point 414 in the branch information of the nearest region. As illustrated in FIG. 4, bottom left and top right coordinates of the nearest region are respectively represented by $(X_{min}, Y_{min})$ and $(X_{max}, Y_{max})$. The divided point 414 is indicated by $(X_{div}, Y_{div})$.

First, the region distance calculator 113 sets a range of a bottom left child region of the nearest region as follows. The bottom left and top right coordinates are respectively $(X_{min}, Y_{min})$ and $(X_{div}, Y_{div})$ (S901).

Then, the region distance calculator 113 sets a range of a bottom right child region of the nearest region as follows. The bottom left and top right coordinates are respectively $(X_{div}, Y_{min})$ and $(X_{max}, Y_{div})$ (S902). The region distance calculator 113 sets a range of a top left child region of the nearest region as follows. The bottom left and top right coordinates are respectively $(X_{min}, Y_{div})$ and $(X_{div}, Y_{max})$ (S903). The region distance calculator 113 sets a range of a top right child region of the nearest region as follows. The bottom left and top right coordinates are respectively $(X_{div}, Y_{div})$ and $(X_{max}, Y_{max})$ (S904).

The region distance calculator 113 calculates region distances d of the bottom left, bottom right, top left and top right child regions by using the following Equation (1) (S905).

Equation 1

$$d^2 = \begin{cases} (X_{min} - x)^2 & \text{If } x < X_{min} \\ 0 & \text{If } X_{min} \leq x \leq X_{max} \\ (x - X_{max})^2 & \text{If } X_{max} < x \end{cases} + \begin{cases} (Y_{min} - y)^2 & \text{If } y < Y_{min} \\ 0 & \text{If } Y_{min} \leq y \leq Y_{max} \\ (y - Y_{max})^2 & \text{If } Y_{max} < y \end{cases} \quad (1)$$

where:

d is a distance value between a divided region R and a query point (x, y); and the range of the divided region R is defined by bottom left coordinate $(X_{min}, Y_{min})$ and top right coordinate $(X_{max}, Y_{max})$.

In Equation (1), a coordinate of the query point is represented by (x, y), a bottom left coordinate of a divided region is represented by $(X_{min}, Y_{min})$, and a top right coordinate is represented by $(X_{max}, Y_{max})$. Equation (1) indicates a square of a distance d between a point nearest to the query point among points on a boundary line of the divided region and the query point. When the divided region includes the query point, the distance between the divided region and the query point is 0.

Figure 10:
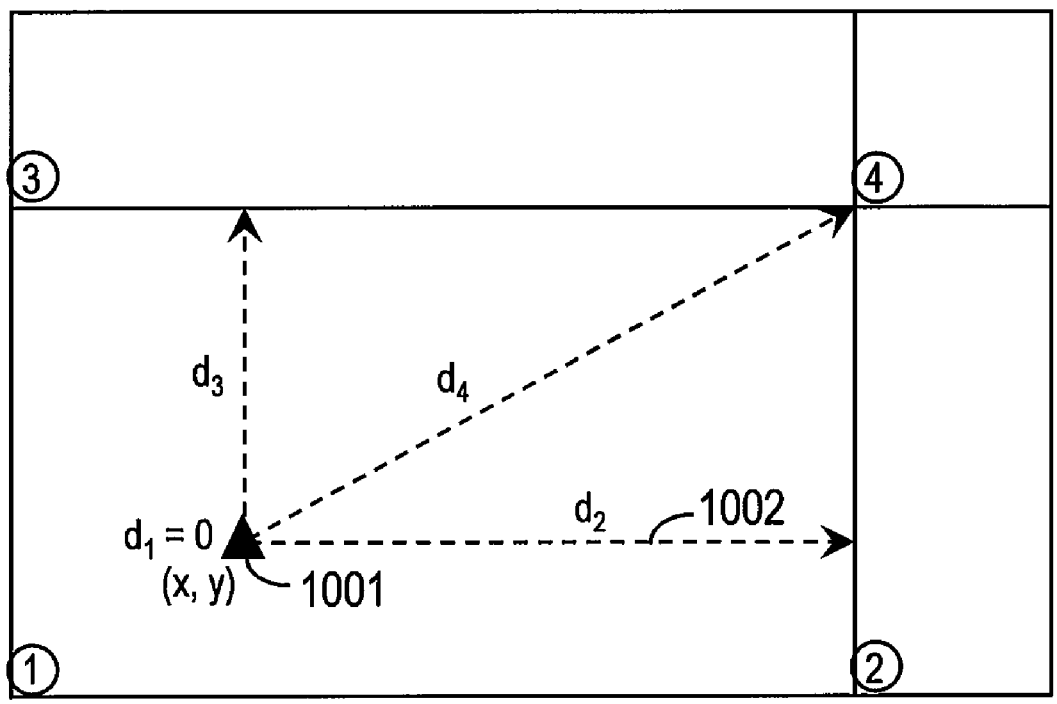
FIG. 10 illustrates a calculation method for a region distance of the divided region, showing an example of the region distance d according to the first embodiment of this invention.

FIG. 10 illustrates a calculation method for a region distance of the divided region, showing an example of the region distance d. Distances $d_1, d_2, d_3$ and $d_4$ from a query point 1001 to divided regions 1, 2, 3 and 4 illustrated in FIG. 10 are indicated by arrows 1002. According to this embodiment, the distance d calculated by Equation (1) is used. In a real environment, a method of reducing a calculation load by directly using a square of d for the region distance d is available. After the calculation of the region distance d in Step S905, the region distance calculator 113 supplies a region ID 412, a pointer, and a region distance d of each child region to the region manager 114 (S906). After completion of the processing, the subroutine is finished to proceed to Step S104 of FIG. 6.

Figure 11:
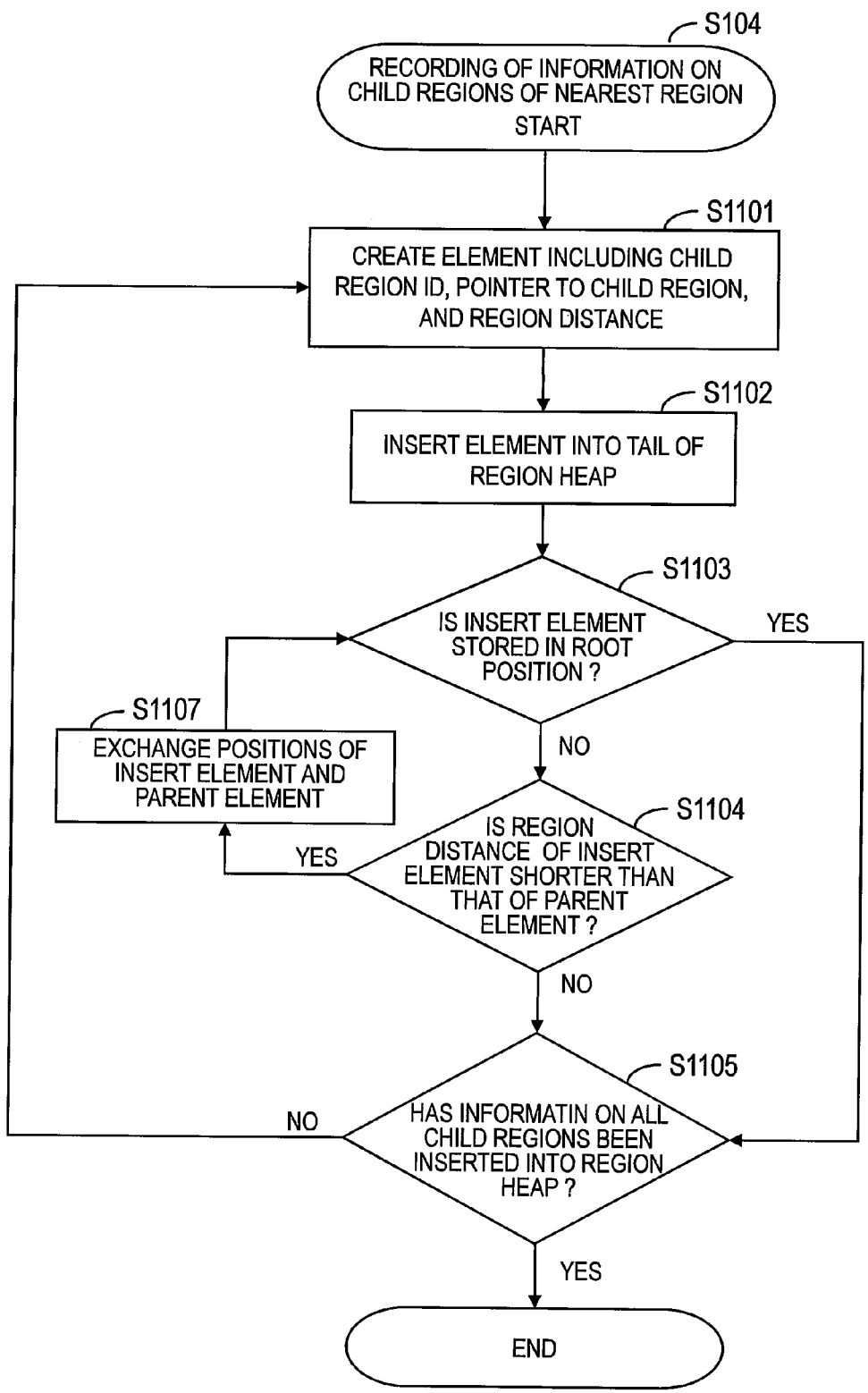
FIG. 11 is a flowchart illustrating a subroutine of a detailed procedure of recoding of information on the child regions of the nearest region according to the first embodiment of this invention.

FIG. 11 is a flowchart illustrating a subroutine of a detailed procedure of recoding information on the child regions of the nearest region (S104). This processing is executed by the region manager 114. First, the region manager 114 generates an element of the region heap 92 constituted by the child region ID 415, the pointer to child region 416, and the region distance d received from the region distance calculator 113 (S1101). In following steps, the region manager 114 selects child regions one by one. The region manager 114 inserts information of a child region to satisfy a condition of the region heap 92 in Steps S1102 to S1104, and S1107. Before an operation of inserting the information of the child region, a heap realizing method will be described.

Figure 12:
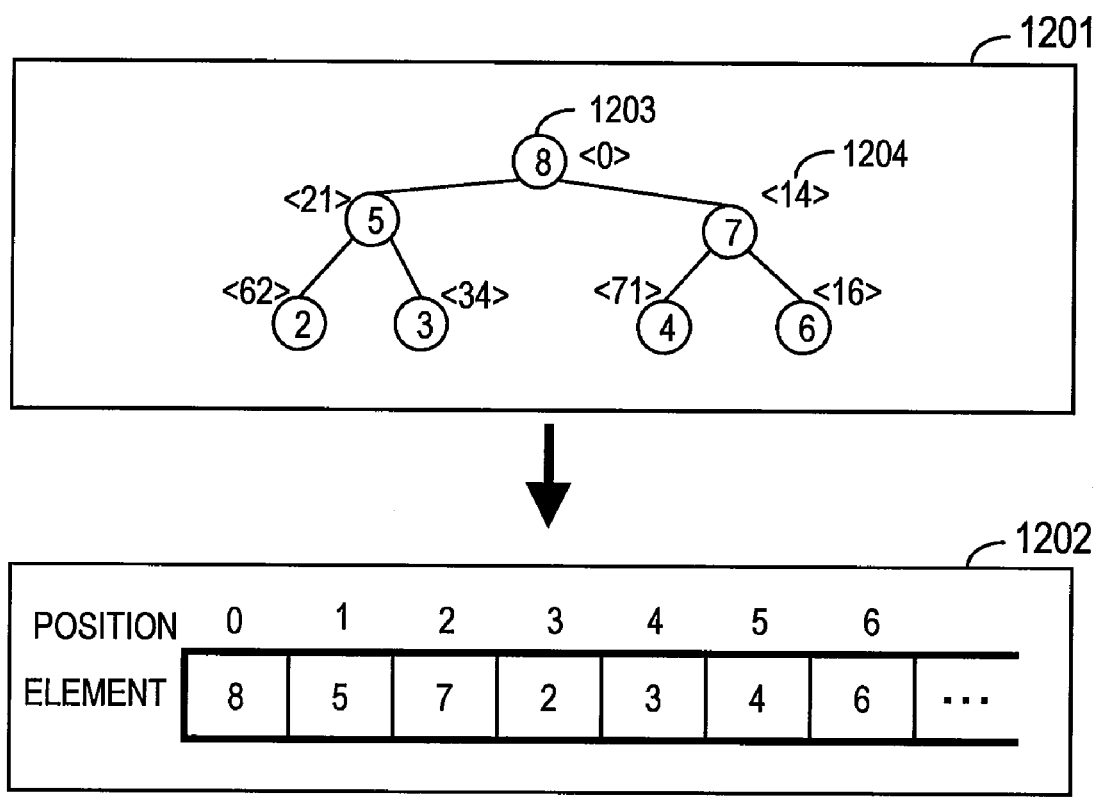
FIG. 12 illustrates an example where a heap tree 1201 applied to the region heap 92 is realized by a one-dimensional array according to the first embodiment of this invention.

FIG. 12 illustrates an example where a heap tree 1201 applied to the region heap 92 is realized by a one-dimensional array 1202. In FIG. 12, a number in a node 1203 of the heap tree 1201 indicates an element identifier, and a numerical value in < > 1204 near the node indicates a preset reference value. The heap tree 1201 is managed so that a reference value of a root element can be minimum under the same heap condition as that of the region heap 92. The one-dimensional array 1202 stores elements in order of increasing depth of the heap tree 1201 or sequentially from the left if the depths are equal.

Referring back to FIG. 11, the region manager 114 first inserts an element into a tail of the region heap 92 (S1102). The tail means a tail of the one-dimensional array. Then, the region manager 114 judges whether the inserted element has been stored in the root of the region heap. A storing position of the root is a 0-th position of the one-dimensional array.

If the condition is not satisfied, the region manager 114 judges whether a region distance d of the inserted element is shorter than a region distance d of a parent element (S1104). If the condition is satisfied, the heap condition of the region heap 92 is not satisfied. In this case, the region manager 114 exchanges storing positions of the inserted element and the parent element (S1107). In the one-dimensional array, a value obtained by subtracting 1 from a minimum integer of a storing position exceeding i/2 is a parent element, where i denotes a storing position of the inserted element.

If the condition of Step S1103 is satisfied, or if the condition of Step S1104 is not satisfied, the heap condition of the region heap 92 is satisfied. In this case, the region manager 114 judges whether pieces of information of all the child regions have been inserted into the region heap 92. If the condition is not satisfied, proceeding to Step S1101, the region manager 114 inserts the pieces of information of the child regions into the heap. On the other hand, if the condition is satisfied, the subroutine is finished, and the processing proceeds to selection of a next nearest region illustrated in FIG. 6 (S105).

Figure 13:
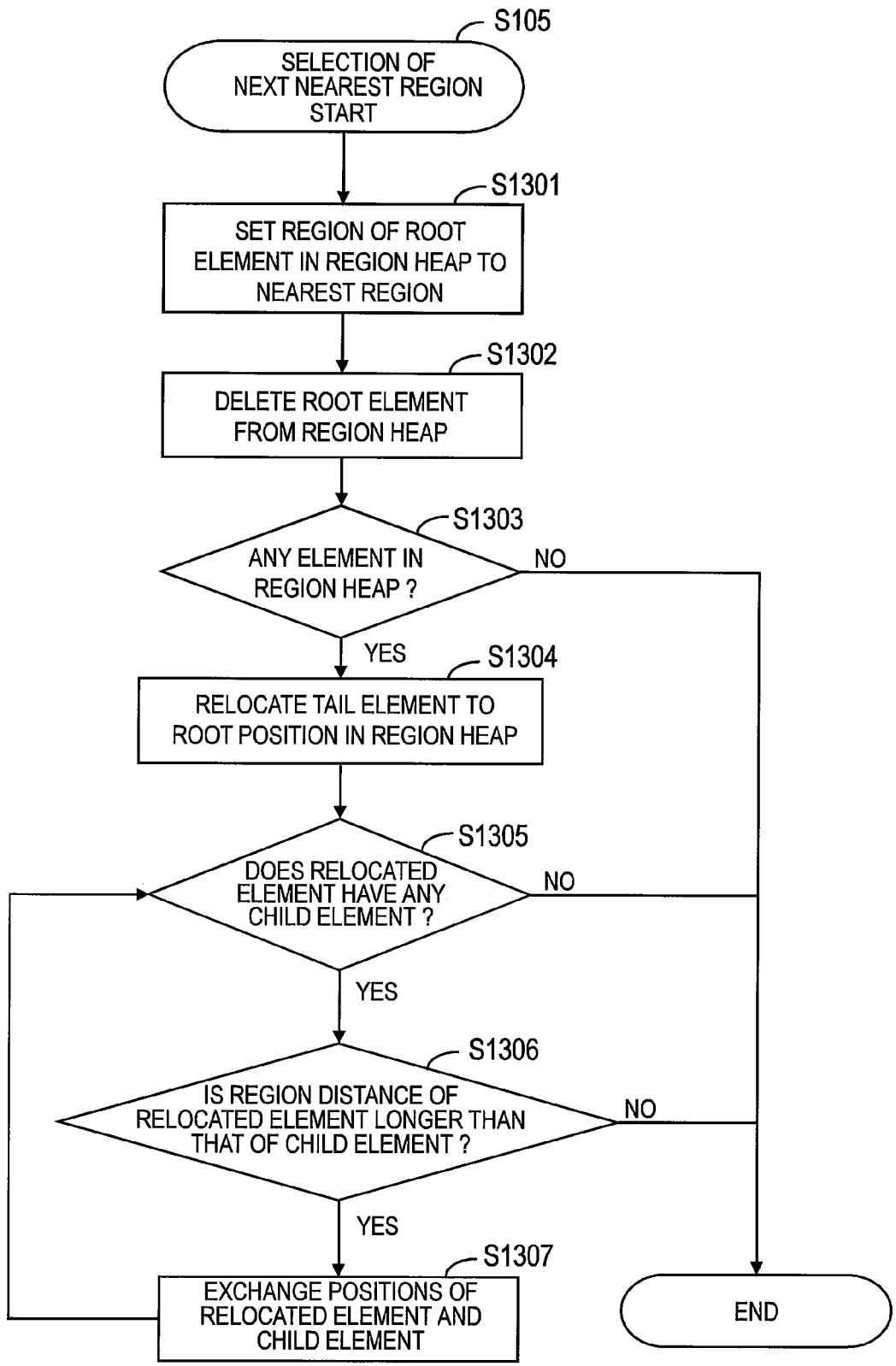
FIG. 13 is a flowchart illustrating a subroutine of a detailed procedure of selecting the nearest region according to the first embodiment of this invention.

FIG. 13 is a flowchart illustrating a subroutine of a detailed procedure of selecting the nearest region (S105). The selection processing of the nearest region is executed by the region manager 114. First, the region manager 114 sets a region corresponding to the root element of the region heap 92 to the nearest region (S1301). The region manager 114 deletes the root element from the region heap 92 (S1302). The region manager 114 judges whether any element is present in the region heap 92 (S1303). If the condition is satisfied, the region manager 114 reconstructs the region heap 92 after the deletion of the root element in Steps S1304 to S1307. If the condition of Step S1303 is not satisfied, the region manager 114 finishes the subroutine because there is no need to reconstruct the region heap 92, and proceeds to the lowest branch check of the nearest region illustrated in FIG. 6 (S102).

On the other hand, if an element is judged to be present in the region heap 92 in Step S1303, the region manager 114 relocates the tail element (relocated element) of the region heap 92 to the root element (S1304). In the one-dimensional array, an element where a storing position is a tail element is relocated to a position where a storing position is 0. Then, the region manager 114 judges whether the relocated element has any child element (S1305). If the condition is not satisfied, the heap condition of the region heap 92 is satisfied. In this case, the region manager 114 finishes the subroutine to proceed to the lowest branch check of the nearest region which is next processing (S102). On the other hand, if the condition of Step S1305 is satisfied, the region manager 114 judges whether a region distance d of the relocated element is larger in value than a region distance d of a child element (S1306). If the condition is satisfied, the heap condition of the region heap 92 is not satisfied. In this case, the region manager 114 exchanges storing positions of the relocated element and the child element to return to Step S1305 (S1307). If the two child elements satisfy the condition of Step S1306, the child element of a shorter region distance d is an exchange target. In the one-dimensional array, the relocated element is exchanged with a child element of a storing position 2×i+1 or 2×i+2, where i denotes a storing position of the relocated element.

If the condition of Step S1306 is not satisfied, the region heap 92 satisfies the heap condition. In this case, the region manager 114 finishes the subroutine to proceed to lowest branch check of the process-target region which is next processing (S102) illustrated in FIG. 6.

Figure 14:
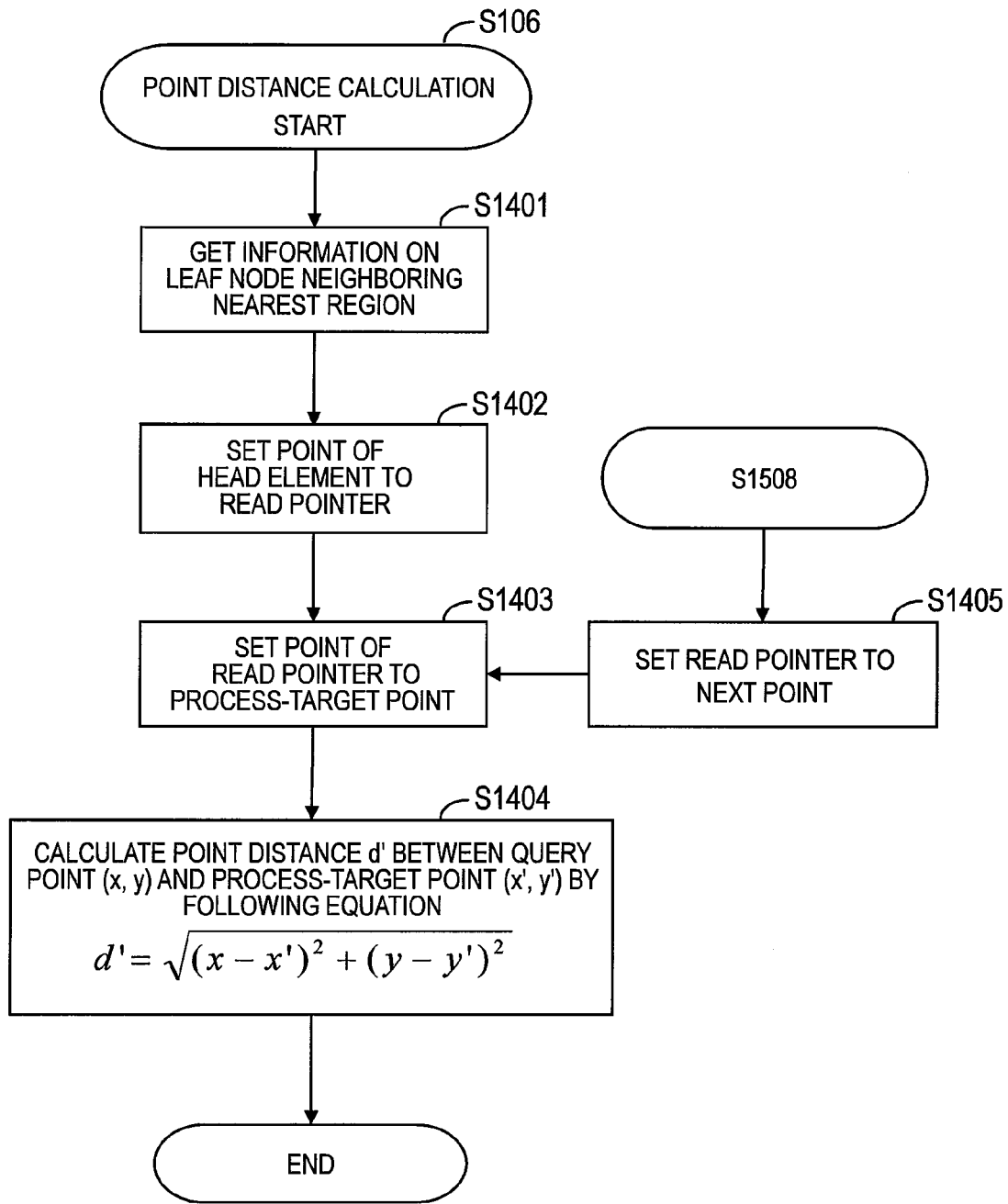
FIG. 14 is a flowchart illustrating a subroutine of a detailed procedure of the point distance calculation according to the first embodiment of this invention.

FIG. 14 is a flowchart illustrating a subroutine of a detailed procedure of the point distance calculation (S106). The point distance calculation processing is executed by the point distance calculator 115. First, the point distance calculator 115 obtains information of a leaf node adjacent to the nearest region (S1401). The point distance calculator 115 can obtain information on the leaf node by referring to a pointer to leaf node 417 of region information of the nearest region stored in the divided region table 401. The point distance calculator 115 sets a point of a head element of the information on the leaf node to a read pointer to point information (S1402). The point distance calculator 115 sets a point indicated by the read pointer to coordinate to a process-target point (S1403). Then, the point distance calculator 115 calculates a point distance d' between a query point and a point by using the following Equation (2) in Step S1404. Equation 2

$$d' = \sqrt{(x-x')^2 + (y-y')^2} \qquad (2)$$

In Equation (2), the point distance d' is a Euclidian distance between a query point (x, y) and a process-target point (x', y'). In a real environment, calculation of a square root may greatly affect a delay of search time. In this case, k-nearest neighbor search may be executed while the point distance d' and the region distance d are kept squares. The point distance calculator 115 finishes the subroutine to proceed to next processing of recording a process-target point as a point in the point heap 91 (S107) illustrated in FIG. 6. The processing of Step S1405 is executed from Step S1508 described below, where distances of points are calculated one by one to be recorded in the point heap 91.

Figure 15:
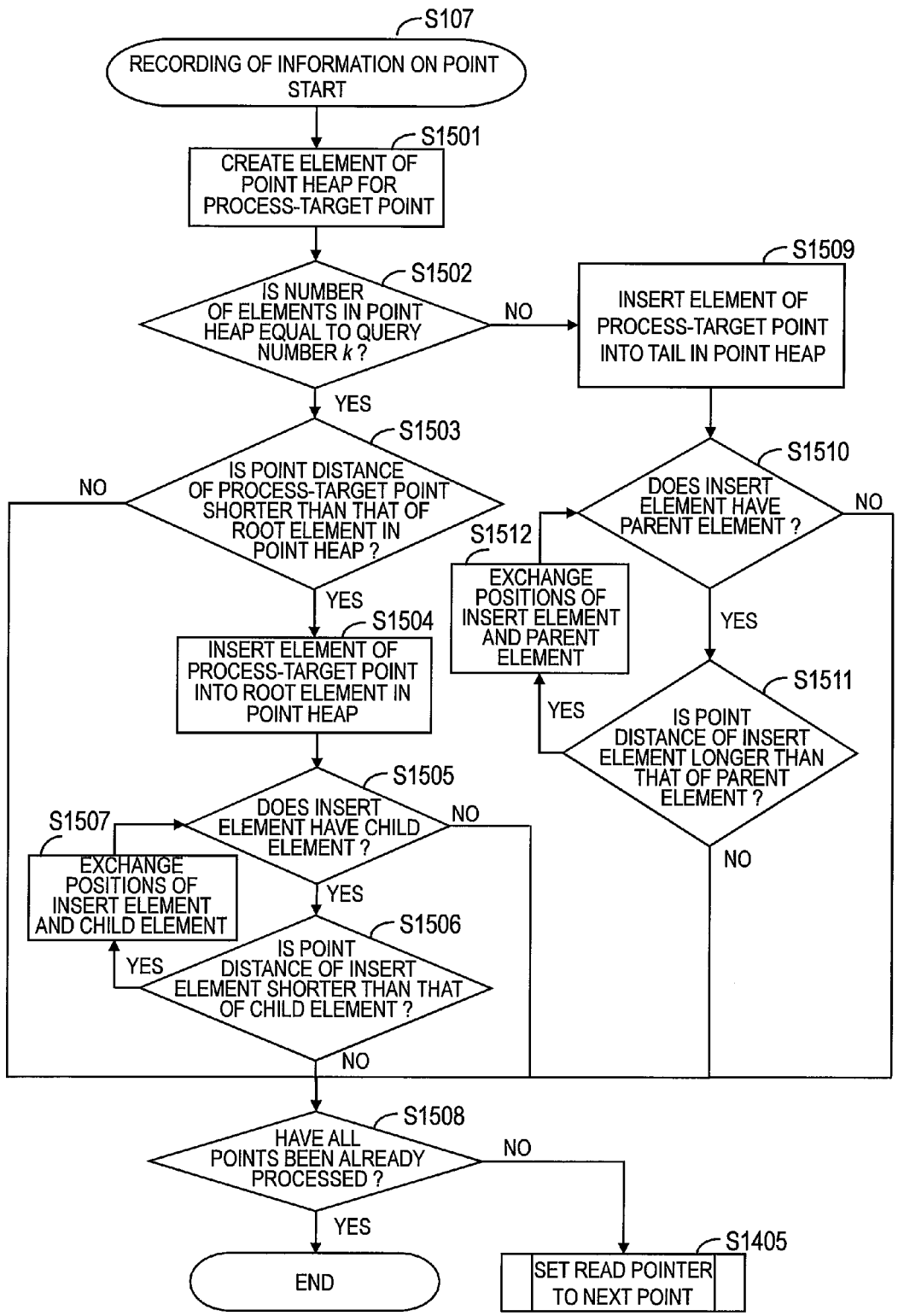
FIG. 15 is a flowchart illustrating a subroutine of a detailed procedure of recording the point in the point heap according to the first embodiment of this invention.

FIG. 15 is a flowchart illustrating a subroutine of a detailed procedure of recording the point in the point heap 91 (S107). The point recording processing is executed by the point manager 116. First, the point manager 116 generates an element of the point heap 91 for the process-target point (S1501). The element is constituted by a point ID 511, a point distance d', and a pointer 513 of the process-target point. The point manager 116 judges whether the number of elements in point heap is equal to the query number. Depending on whether the point heap 91 has stored k nearest points, subsequent processing contents vary.

If the condition of Step S1502 is satisfied, the query number of the point heap 91 is satisfied. In this case, the point manager 116 judges whether the point distance d' of the process-target point is shorter than a point distance d' of a point farthest from the query point in the point heap 91 (S1503). The point farthest from the query point in the point heap 91 is a root element of the point heap 91. If the condition is satisfied, the process-target point replaces the root element of the point heap 91 as a new point.

In Steps S1504 to S1507, the point manager 116 records the process-target point in the point heap 91 while satisfying the heap condition. On the other hand, if the condition of Step S1503 is not satisfied, the process-target point is not set as a point. In this case, the point manager 116 proceeds to Step S1508.

If the condition of Step S1502 is not satisfied, the point heap 91 does not satisfy the query number. In this case, the point manager 116 is presupposed to insert the element of the process-target point into the point heap 91. In Steps S1510 to S1512, the point manager 116 stores the element of the process-target point in the point heap 91 while satisfying the heap condition.

The point manager 116 proceeds to Step S1508 to judge whether all points of the nearest region have been checked to be points. If the condition is satisfied, the point manager 116 finishes the subroutine to proceed to termination check (S108). On the other hand, if the condition of Step S1508 is not satisfied, the point manager 116 proceeds to Step S1405 illustrated in FIG. 14 to calculate distances of points one by one for each loop, and to record the distances in the point heap 91.

Figure 16:
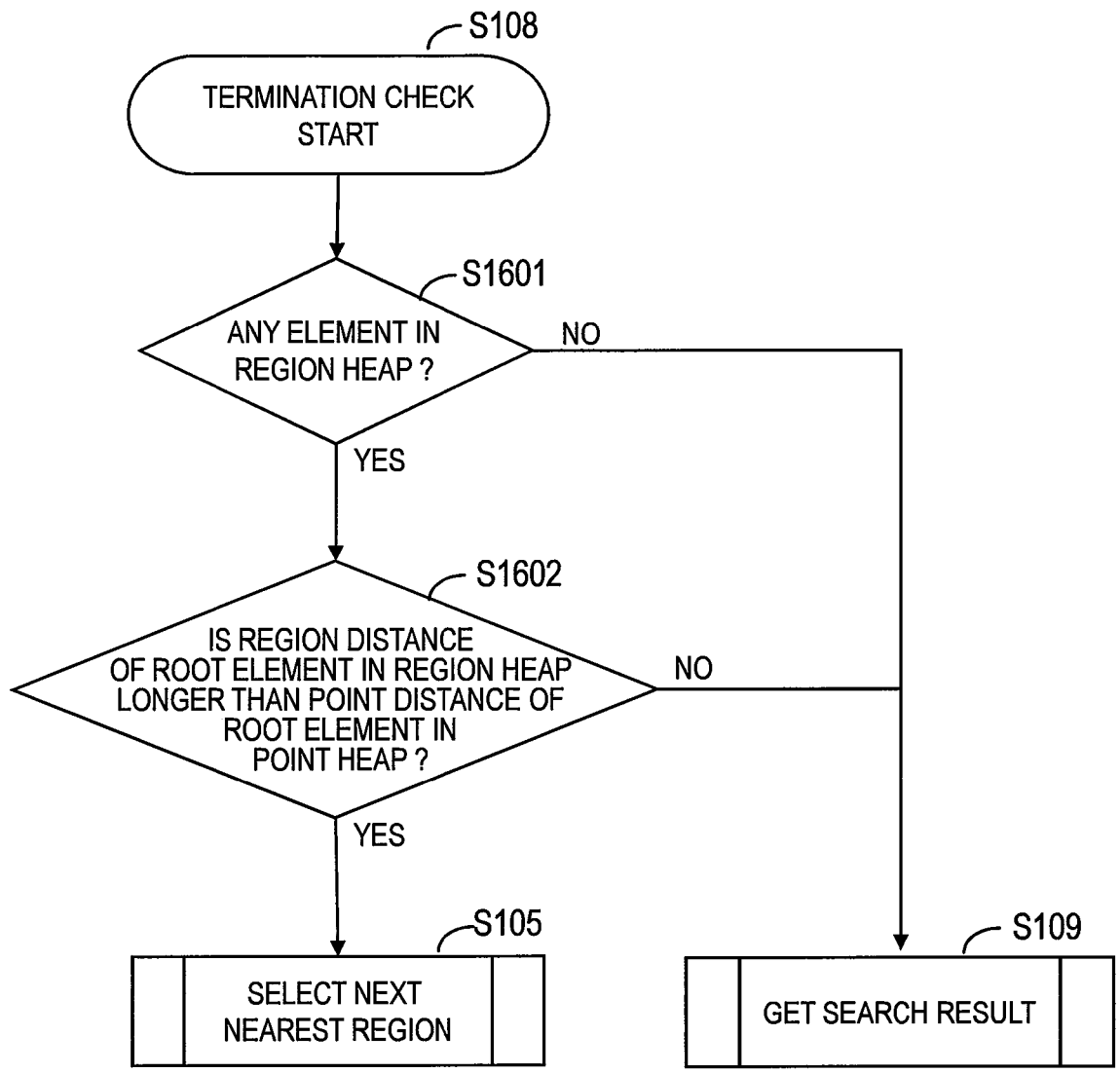
FIG. 16 is a flowchart illustrating a procedure of the termination check according to the first embodiment of this invention.

FIG. 16 is a flowchart illustrating a procedure of the termination check (S108). The termination check processing is executed by the termination checker 117. First, the termination checker 117 judges whether an element is present in the region heap 92. If the condition is not satisfied, there is no divided region to be checked next. Thus, the termination checker 117 selects acquisition of a search result (S109) of FIG. 6 as next processing (S1604).

On the other hand, if the condition of Step S1601 is satisfied, the termination checker 117 judges whether a region distance d of the root element in the region heap 92 is longer than a point distance d' of the root element of the point heap 91 (S1602). If the condition is satisfied, the search processing is finished. A termination condition is that the region distance d of the root element in the region heap 92 is longer than the point distance d' of the root element of the point heap 91. This condition means that no points to be set as points can be found even if points in a divided region present within a wider range are checked. The termination condition checking can be realized by the number of searching times O(1) in the point heap 91 because a heap structure is used for storing regions and points. If the condition of Step S1602 is satisfied, the termination checker 117 selects acquisition of a search result illustrated in FIG. 6 (S109) as next processing to finish the subroutine. On the other hand, if the condition of Step S1602 is not satisfied, to check points included in another divided region, the termination checker 117 executes selection of a nearest region illustrated in FIG. 6 (S105) as next processing to finish the subroutine.

Figure 17:
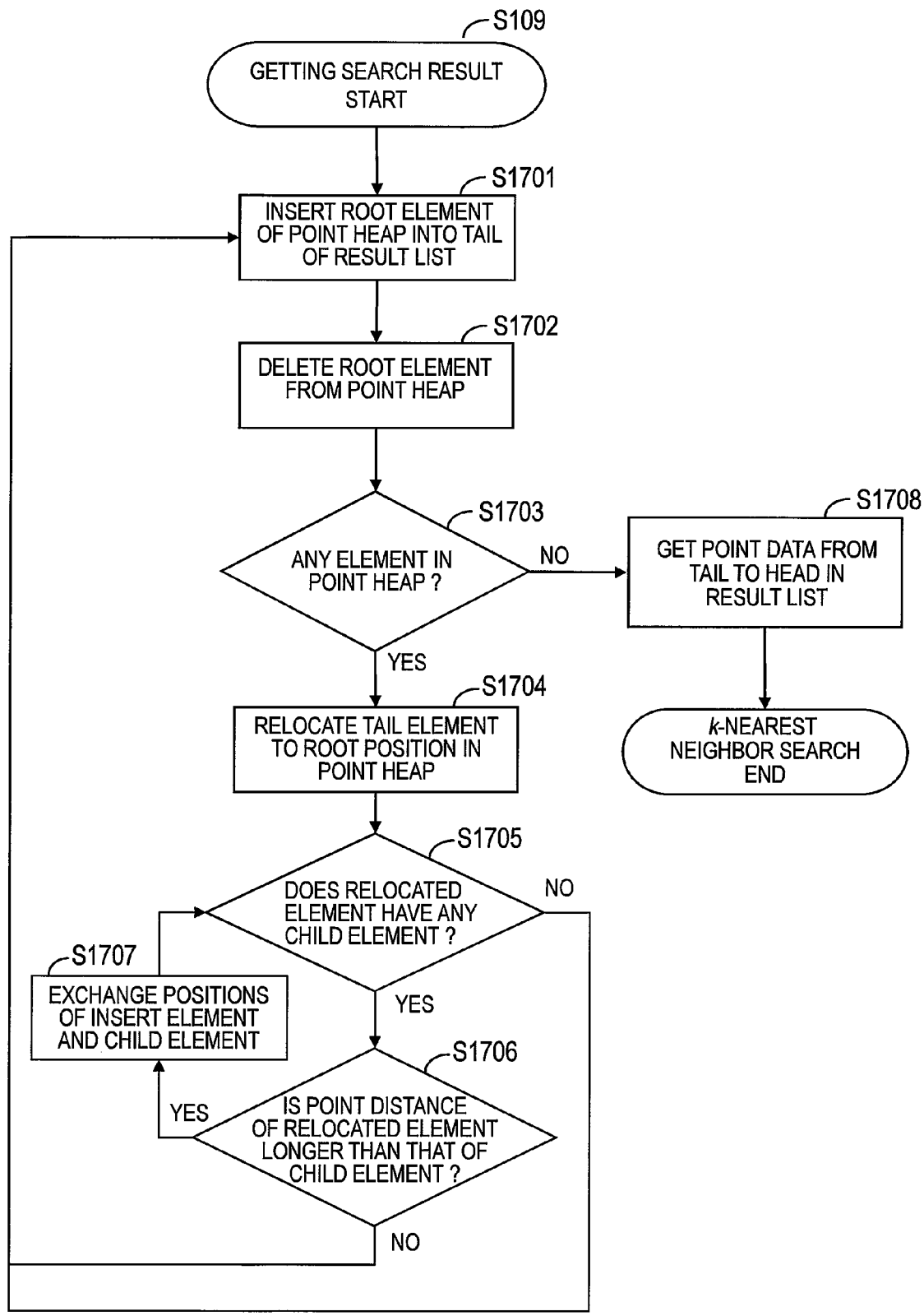
FIG. 17 is a flowchart illustrating a subroutine of a detailed procedure of obtaining a search result according to the first embodiment of this invention.

FIG. 17 is a flowchart illustrating a subroutine of a detailed procedure of obtaining a search result (S109). The search result obtaining processing is executed by the result manager 118. This processing enables the result manager 118 to obtain points from a query point in ascending order of distances.

First, the result manager 118 inserts the root element of the point heap 91 into a tail of a result list 93 (S1701). The result list 93 is a one-dimensional array capable of storing the same element as that of the point heap 91, and an area allocated beforehand in the memory 2 by the result manager 118. The result manager 118 deletes the root element from the point heap 91 (S1702). Then, the result manager 118 judges whether any element is present in the point heap 91 (S1703). If the condition is satisfied, the result manager 118 reconstructs the point heap 91 after the deletion of the root element in Steps S1704 to S1707. If the condition of Step S1703 is not satisfied, the result manager 118 obtains points one by one from a tail to a head of the result list 93 (S1708). The point is a record containing a coordinate 512 and any number of attributes to be managed on the spatial database 100.

Thus, in this processing, first, heaps are sorted in descending order of point distances d', and results thereof are stored sequentially from the head of the result list 93 constituted by the one-dimensional array. By obtaining points from the tail to the head of the one-dimensional array, points are obtained in ascending order of distances from the query point. The number of searching times until a result is obtained can be reduced to $O(N \cdot \log N)$, where N denotes the number of elements of points, $O(N \cdot \log N)$ denotes the number of searching times of heap sort. After the result manager 118 finishes Step S1708, the k-nearest neighbor search is finished.

Referring to FIGS. 18A to 18C, 19, and 20, specific algorithm operation of the above-mentioned k-nearest neighbor search will be described below.

Figures 18A, 18B, 18C:
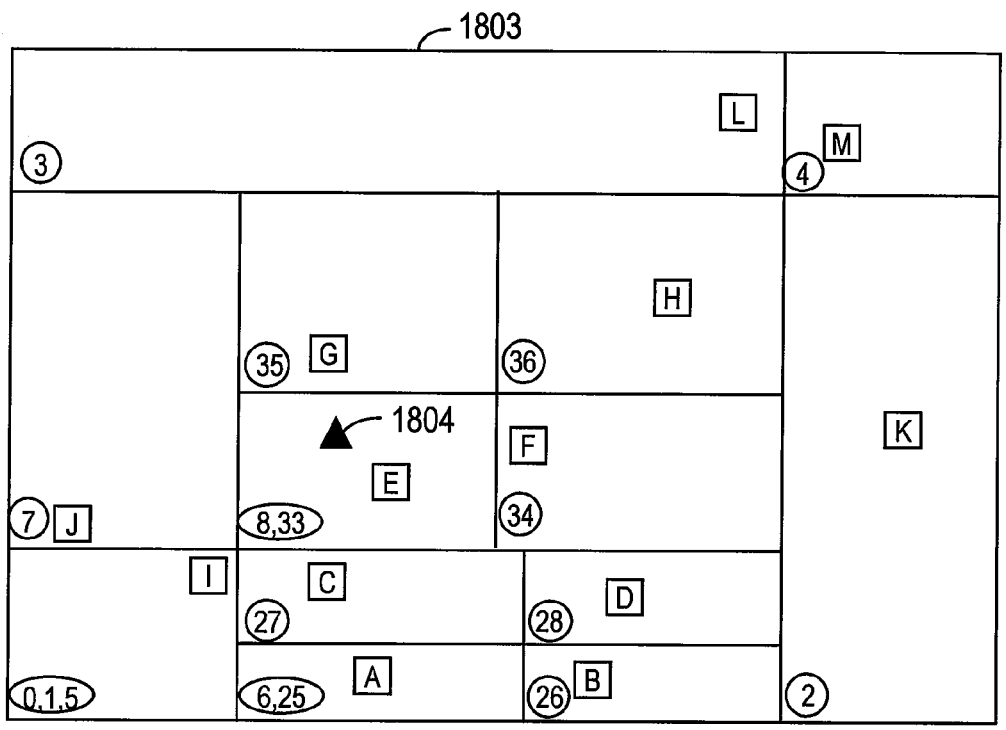
FIG. 18A is a two-dimensional diagram of a spatial region 1803, in which the spatial region 201 of FIG. 2.
FIG. 18B illustrates a table 1801 in which a region distance d of the spatial region 1803.
FIG. 18C illustrates a table 1802 in which a point distance d' of the spatial region 1803.

FIG. 18A is a bird's-eye view of a spatial region 1803, in which the spatial region 201 of FIG. 2 is seen directly above the tier of a depth 0. This spatial region 1803 is an example in which a query point 1804 is set and the query number is set to 5 in the k-nearest neighbor search. A numerical value in a circle (shown) indicates a region ID 412. A character in a square frame (shown) indicates a point ID 511. FIG. 18B illustrates a table 1801 in which a region distance d of the spatial region 1803 calculated in a processing process of the k-nearest neighbor search is represented in a table form. FIG. 18C illustrates a table 1802 in which a point distance d' of the spatial region 1803 calculated in the processing process of the k-nearest neighbor search is represented in a table form. Pieces of information of the tables 1801 and 1802 are respectively stored in the region heap and the point heap in the memory 2.

Figure 19:
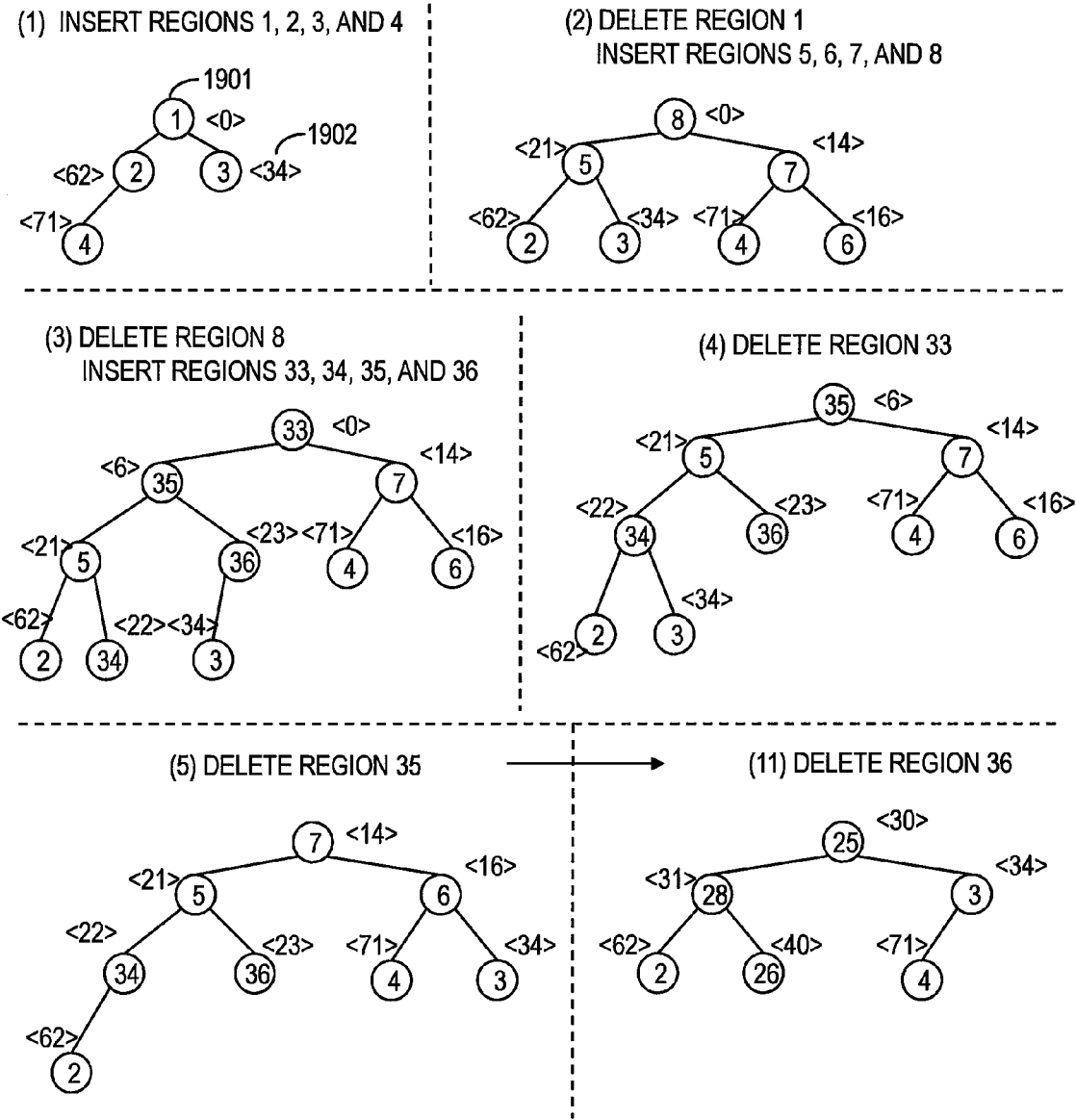
FIG. 19 illustrates a storage situation of the region heap 92 when k-nearest neighbor search is executed by using the spatial region 1803 of FIG. 18A according to the first embodiment of this invention.

FIG. 19 illustrates a storage situation of the region heap 92 when k-nearest neighbor search is executed by using the spatial region 1803 of FIG. 18A. The region heap 92 is represented by a tree structure. A numeral in a node 1901 of a heap tree indicates a region ID 412, and a numeral in an angle bracket 1902 indicates a distance of a divided region indicated by the region ID 412.

Figure 20:
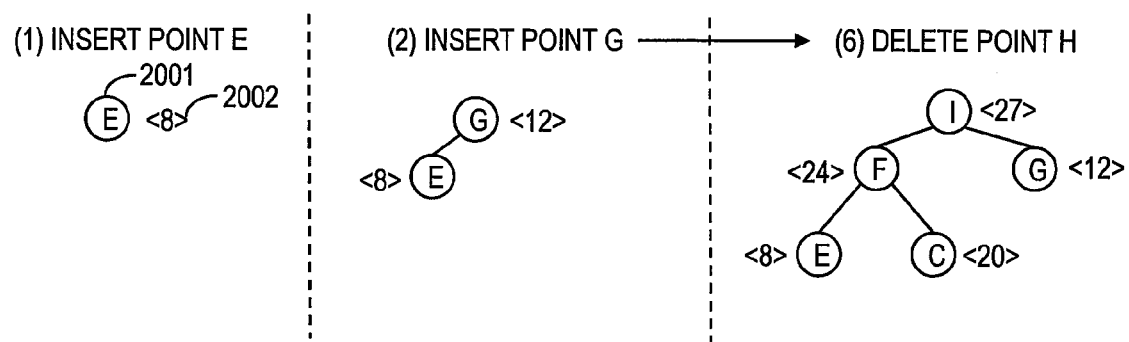
FIG. 20 illustrates a storage situation of the point heap 91 when k-nearest neighbor search is executed by using the spatial region 1803 of FIG. 18A according to the first embodiment of this invention.

FIG. 20 illustrates a storage situation of the point heap 91 when k-nearest neighbor search is executed by using the spatial region 1803 of FIG. 18A. The point heap 91 is represented by a tree structure. An alphabet in a node 2001 of a heap tree indicates a point ID 511, and a numerical value in an angle bracket 2002 indicates a point distance d' of a point indicated by the point ID 511.

When k-nearest neighbor search is executed, first, the initial setting manager 111 sets a nearest region to 0. The region distance calculator 113 calculates region distances d of child regions 1, 2, 3 and 4 of the region 0, and stores pieces of region information of the child regions in the region heap 92 ((1) of FIG. 19). The region manager 114 sets a nearest region to 1, and deletes information of the region 1 from the region heap 92. The region manager 114 stores pieces of information of child regions 5, 6, 7 and 8 of the region 1 in the region heap 92 ((2) of FIG. 19). Similarly, the region manager 114 sets a nearest region to 8. The region manager 114 similarly deletes information of the region 8 from the region heap 92, and inserts pieces of information of child regions 33, 34, 35 and 36 of the region 8 into the region heap 92 ((3) of FIG. 19). The region manager 114 sets a nearest region to the region 33 of a lowest branch. In this case, the region manager 114 deletes information of the region 33 from the region heap 92, and inserts a point E included in the region 33 into the point heap 91. A storage situation of the region heap 92 in this case is shown in (4) of FIG. 19, and a storage situation of the point heap 91 is shown in (1) of FIG. 20. When a nearest region is set to the region 35, as in the case of the region 33, the region heap 92 and the point heap 91 are updated ((5) of FIG. 19 and (2) of FIG. 20).

Through similar processing thereafter, storage situations of the region heap 92 and the point heap 91 are as shown in (11) of FIG. 19 and (6) of FIG. 20. In this case, a point distance d' of a root element (point I) of the point heap 91 is shorter than a region distance d of a root element (region 25) of the region heap 92. Accordingly, a termination condition is satisfied, and hence results of the k-nearest neighbor search are points I, F, G, E and C.

A medium recording a k-nearest neighbor search program having a function similar to that of the first embodiment and a k-nearest neighbor search device are included within this invention. The same holds true for second and third embodiments described below.

According to the first embodiment of this invention, the number of disk accesses to the spatial index 101 during search execution can be reduced, and thus search time can be shortened as compared with the k-nearest neighbor search using the range search. Moreover, according to the first embodiment, only minimum necessary points are targets of distance calculation. Thus, a calculation load of the CPU 3 can be reduced as compared with the conventional k-nearest neighbor search.

Second Embodiment

The second embodiment is an extension of the first embodiment and is designed to realize k-nearest neighbor search considering attribute search for solving the above-mentioned third problem.

Specifically, the point table 501 of FIG. 5 of the first embodiment is extended to employ a point table 2101 illustrated in FIG. 21. FIG. 21 illustrates an example of a point table for information on a leaf node of a quadtree. The point table 2101 includes, in addition to a point ID 511, coordinates 512 of X and Y coordinates, and a pointer 513, a point type 514 in point information of the table for storing points. For example, in the case of a point table of a car navigation device 1, the point type may store types of a point such as a restaurant, a parking lot, a gas station, and so on. With the addition of the point type 514 to the point information, in the information on the leaf node of the quadtree, a point type 514 is added to point information of each point.

Processing of the second embodiment basically conforms to the flowchart of FIG. 6 of the first embodiment. In the second embodiment, however, processing contents of the initial setting S101 of the search of FIG. 6 and the calculation S106 of the point distance d' are partially changed. Processing contents changed to realize this embodiment will be described below.

Figure 22:
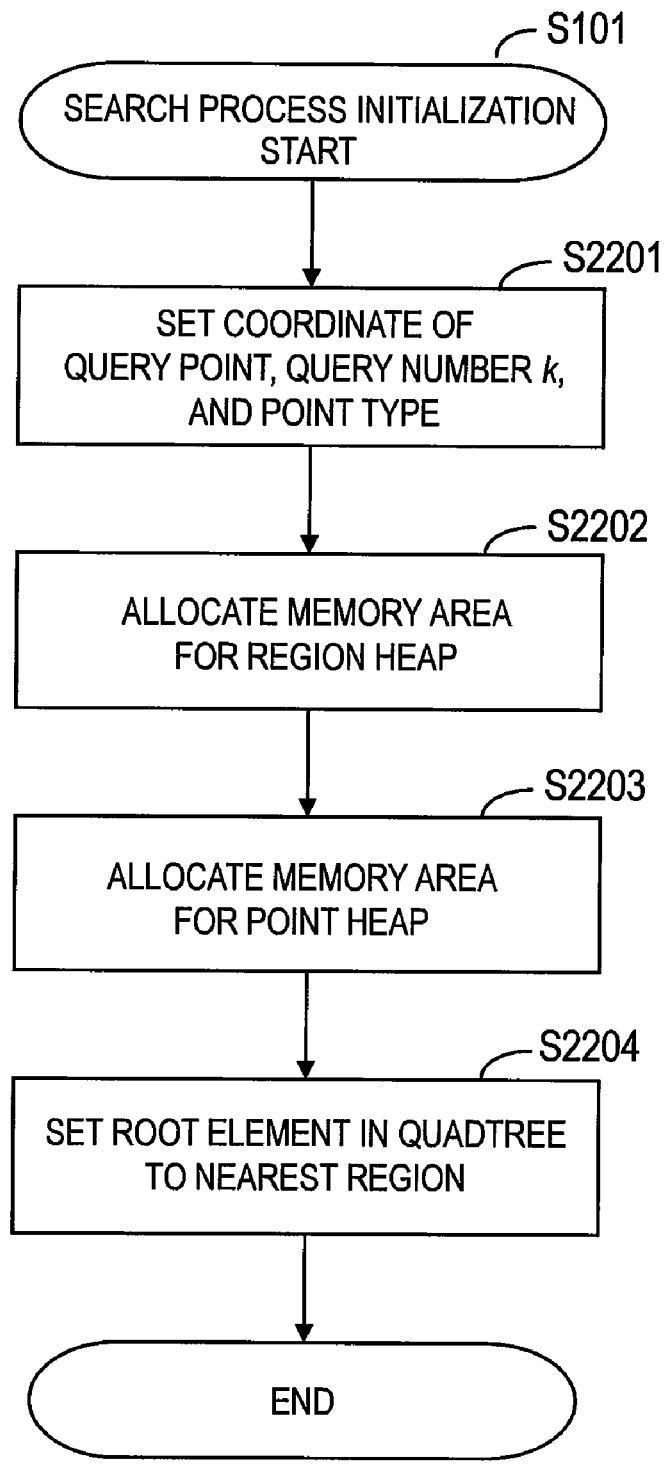
FIG. 22 is a flowchart illustrating a subroutine of a procedure of search initial setting (S101) of the second embodiment.

FIG. 22 is a flowchart illustrating a subroutine of a procedure of search initial setting (S101) of the second embodiment. A difference from the first embodiment illustrated in FIG. 7 is that Step S701 of FIG. 7 is changed to Step S2201. In Step S2201, an initial setting manager 111 sets a point type in addition to coordinates of a query point and the query number. An execution result of k-nearest neighbor search of this embodiment contains points matching the point type. Steps S2202 to S2204 are similar to Steps S702 to S704 of FIG. 7 of the first embodiment.

Figure 23:
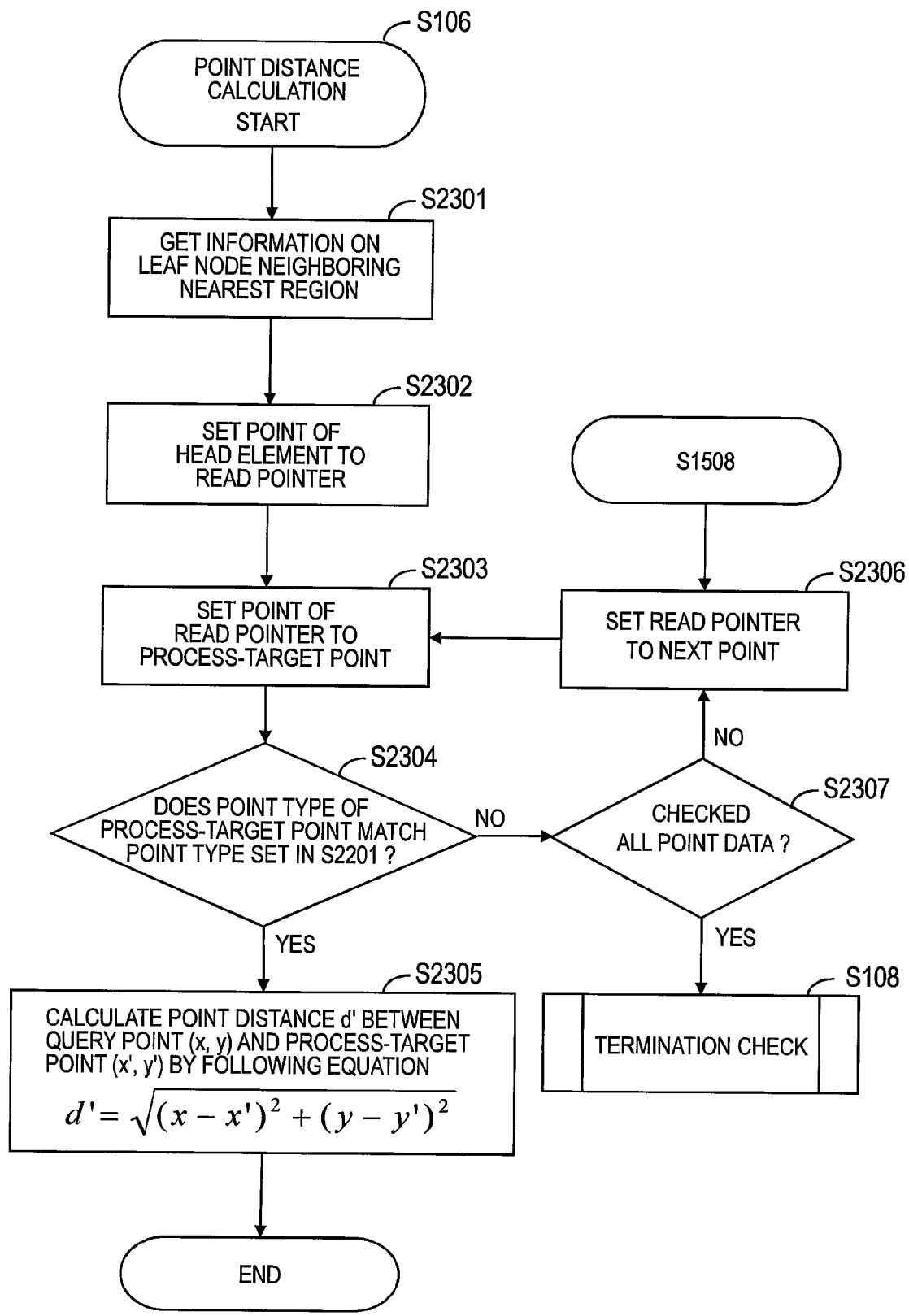
FIG. 23 is a flowchart illustrating a subroutine of a procedure of point distance calculation (S106) of the second embodiment.

FIG. 23 is a flowchart illustrating a subroutine of a procedure of point distance calculation (S106) of the second embodiment. FIG. 23 is different from the flowchart of FIG. 14 of the first embodiment in that Steps S2304 and S2307 are added, and the process proceeds to processing (S108) of a termination checker 117 if judgment of Step S2307 is YES.

In Step S2304, a point distance calculator 115 judges whether a point type of a process-target point matches the point type set in Step S2201 of the initial setting manager. If a result of judgment is NO, the process proceeds to Step S2307. Through Step S2304, in the second embodiment, only points matching a designated attribute value can be obtained. In FIG. 23, Steps S2301 to S2303, S2305, and S2306 are similar to Steps S1401 to S1404 and S1405 of FIG. 14 of the first embodiment.

According to the second embodiment of this invention, even when k-nearest neighbor search and attribute search are combined, search execution time can be shortened as compared with the conventional k-nearest neighbor search. It is because in the second embodiment, the k-nearest neighbor search can be executed only by searching of a spatial index 101. According to the second embodiment, k points matching a designated attribute value can be accurately obtained. It is because in the second embodiment, in a point table 2101 of search targets, k-nearest neighbor search can be executed for one row including point information and attribute information.

Third Embodiment

The third embodiment is an extension of the first embodiment and is designed to provide nearest neighbor search for solving the above-mentioned fourth problem. Processing of the third embodiment basically conforms to the flowchart of FIG. 6 of the first embodiment. Specifically, an interruption condition is set in search conditions so that search processing can be interrupted even during searching processing. For example, an interruption condition is described by a distance from a query point. In this case, search processing is interrupted at time when no point present within a range of the distance is found. As an interruption condition, setting of maximum processing time is effective. In this case, time which can be expended for the search processing is set to maximum processing time and, at time when an elapsed time of the search processing becomes equal to the maximum processing time, the search processing is interrupted. A case where a distance is used as an interruption condition in the third embodiment will be described below.

The initial setting manager 111 sets a maximum distance value (referred to as query distance hereinafter) from the query point and, even if the query number is not reached at time when no point equal to or shorter than the query distance can be found, the search processing is finished. The extension of the third embodiment to the first embodiment can be similarly applied to the second embodiment, and the fourth problem can be solved. In the third embodiment, the processing contents of search initial setting S101, Step S103 of calculation of the region distance d, and Step S106 of calculation of the point distance d' of FIG. 6 of the first embodiment are changed. The processing contents changed to realize the third embodiment will be described below.

Figure 24:
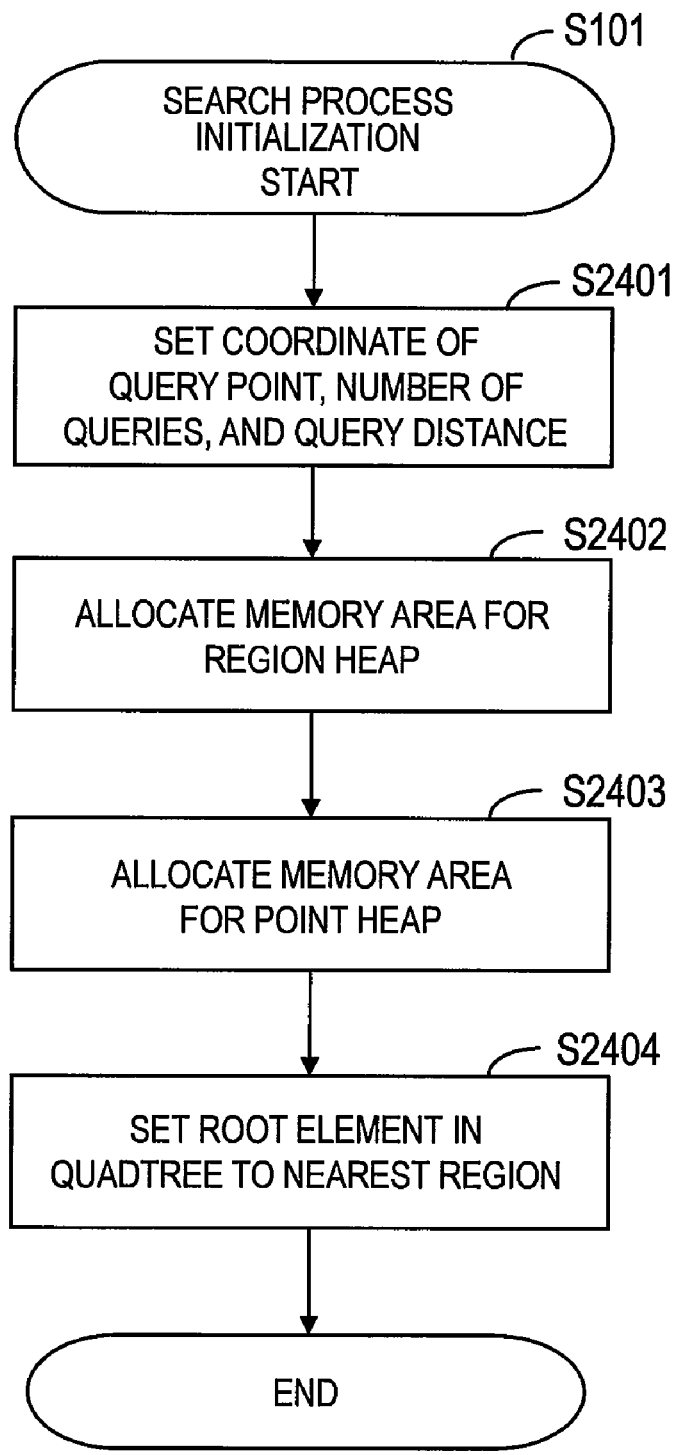
FIG. 24 is a flowchart illustrating a subroutine of a procedure of initial setting (S101) of the third embodiment.

FIG. 24 is a flowchart illustrating a subroutine of a procedure of initial setting (S101) of the third embodiment. In this flowchart, Step S601 of FIG. 7 of the first embodiment is replaced by Step S2401. In Step S2401, an initial setting manager 111 sets a query distance in addition to coordinates of a query point and a query number. An execution result of k-nearest neighbor search of the third embodiment contains only points having values of distance from the query point equal to or shorter than a query distance. Steps S2402 to S2404 are similar to Steps S702 to S704 of FIG. 7 of the first embodiment.

Figure 25:
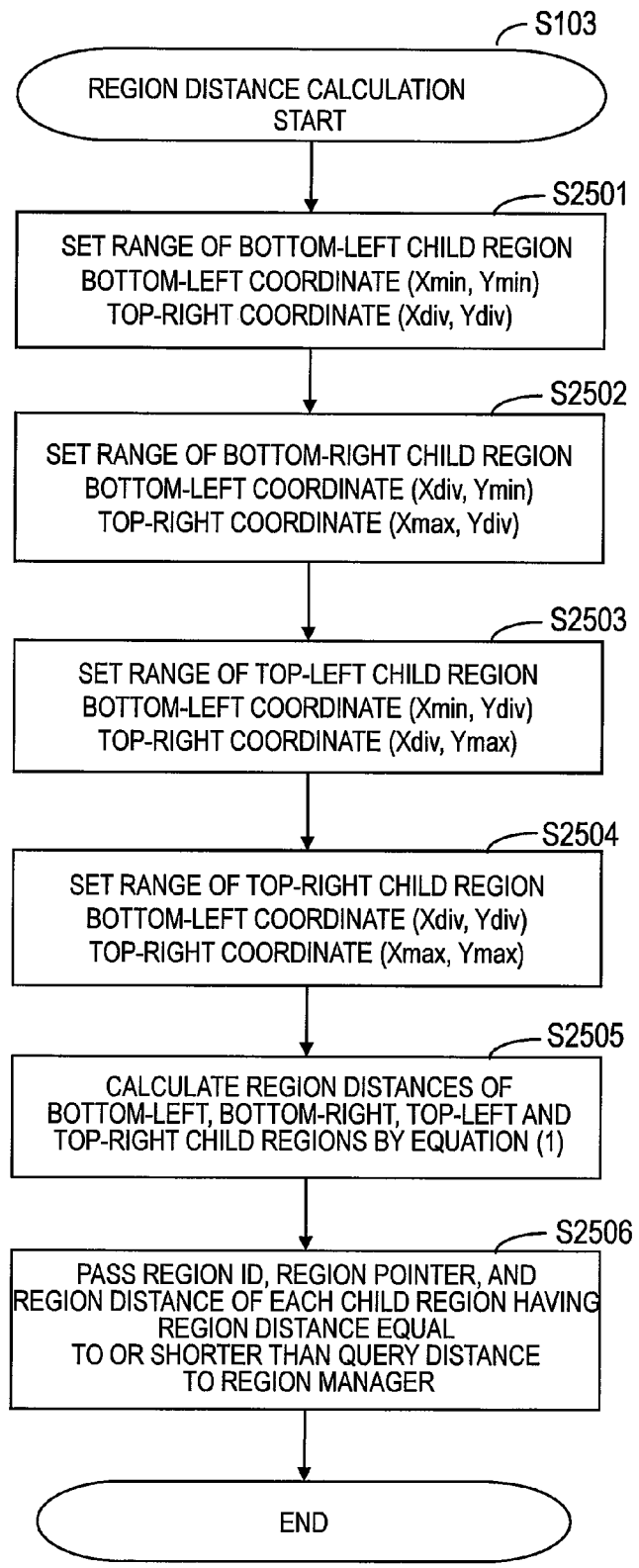
FIG. 25 is a flowchart illustrating a subroutine of a procedure of region distance calculation (S103) of the third embodiment.

FIG. 25 is a flowchart illustrating a subroutine of a procedure of region distance calculation of the third embodiment. In this flowchart, Step S906 of FIG. 9 of the first embodiment is replaced by Step S2506. In Step S2506, a region distance calculator 113 supplies a region ID 412, a region pointer, and a region distance d to a region manager targeting a child region having a region distance d equal to or shorter than the query distance. Through Step S2506, a region heap 92 records only information of a divided region having a region distance d equal to or shorter than the query distance. The divided region having a region distance d equal to or shorter than the query distance includes a point satisfying a condition of the query distance and possibly set as a result candidate. Steps S2501 to S2505 are similar to Steps S901 to S905 of FIG. 9 of the first embodiment.

Figure 26:
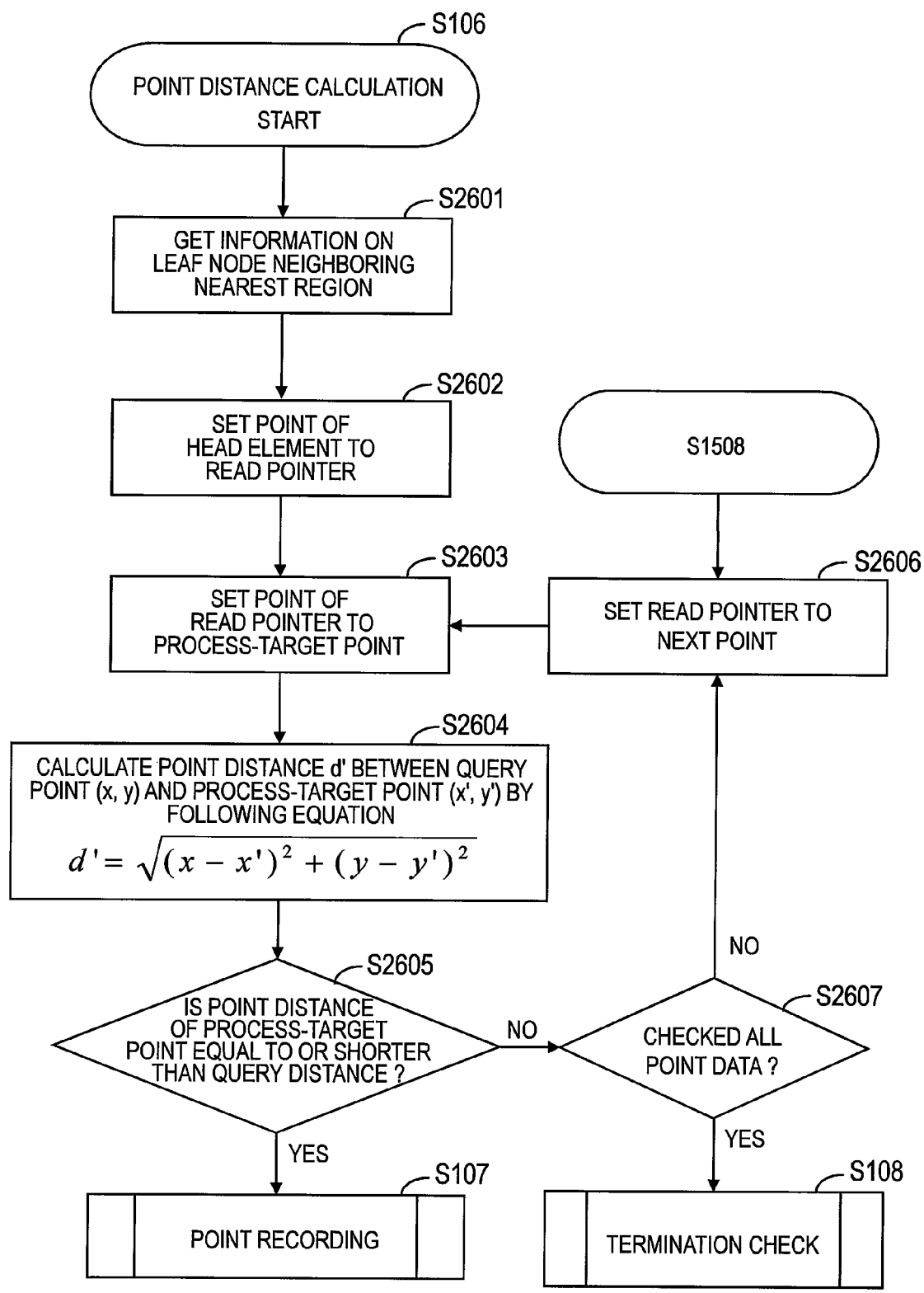
FIG. 26 is a flowchart illustrating a subroutine of a procedure of point distance calculation (S106) of the third embodiment.

FIG. 26 is a flowchart illustrating a subroutine of a procedure of point distance calculation of the third embodiment. In this flowchart, Steps S2605 and S2607 are added after Step S1404 of FIG. 14 of the first embodiment.

Processing (S2605) of judging whether a point distance d' is equal to or shorter than the query distance is added after calculation of the point distance d' of a process-target point of Step S2604. If the condition is satisfied, the process proceeds to recording processing of a point (S107). If the condition is not satisfied, the process-target point is not included in a search result. Thus, unless all points have been processed (NO in Step S2607), the process proceeds to calculation of a point distance d' of the next point. Steps S2601 to S2604 and S2606 are similar to Steps S1401 to S1404 and S1405 of FIG. 14 of the first embodiment.

According to the third embodiment of this invention, neighborliness of an execution result of k-nearest neighbor search can be guaranteed. It is because the third embodiment enables setting of an interruption condition as one of search conditions. The interruption condition is, for example, a maximum distance from the query point or maximum processing time which can be expended for search processing.

Fourth Embodiment

A fourth embodiment is directed to a query language or a function described when k-nearest neighbor search is executed by a DBMS 8. The fourth embodiment is equivalent to, for example, SQL when an application developer requests k-nearest neighbor search to the DBMS 8 from an application program. The fourth embodiment will be described below by using the SQL which is a general query language of the database management system 8.

FIGS. 27A to 27D illustrate the fourth embodiment, each illustrating a SQL description example for k-nearest neighbor search realized by any one of the first to third embodiments. In FIGS. 27A to 27D, a spatial database 100 obtains all rows of records matching k-nearest neighbor search for one table storing points.

SQL of 2701 in FIG. 27A is usable only in the k-nearest neighbor search realized by the first embodiment. In 2701, k-nearest neighbor (kNN) of a where-phrase indicates a scalar function for k-nearest neighbor search. First to third arguments of the kNN function are respectively a coordinate column name, a query point, and the query number of a search target table.

SQL of 2702 in FIG. 27B is usable in the k-nearest neighbor search realized by the first or second embodiment. First to fourth arguments of a kNN function of 2702 are respectively a coordinate column name, a query point, the query number, and a point type of a search target table. No type needs to be set in the k-nearest neighbor search realized by the first embodiment, and thus NULL is set in the fourth argument.

SQL of 2703 in FIG. 27C is usable in the k-nearest neighbor search realized by the first or third embodiment. First to fourth arguments of a kNN function of 2703 are respectively a coordinate column name, a query point, the query number, and a query distance of a search target table. No query distance needs to be set in the k-nearest neighbor search realized by the third embodiment, and thus NULL is set in the fourth argument.

SQL of 2704 in FIG. 27D is usable in the k-nearest neighbor search realized by any of the first to third embodiments. First to fifth arguments of a kNN function of 2704 are respectively a coordinate column name, a query point, the query number, a point type, and a query distance of a search target table. This description is also usable in k-nearest neighbor search realized by a combination of the second and third embodiments. No query distance needs to be set in the k-nearest neighbor search realized by the third embodiment, and thus NULL is set in each of the fourth and fifth arguments. No query distance needs to be set in the k-nearest neighbor search realized by the second embodiment, and thus NULL is set in the fifth argument. No type needs to be set in the k-nearest neighbor search realized by the third embodiment, and thus NULL is set in the fourth argument.

According to the fourth embodiment of this invention, the application program developer can describe k-nearest neighbor search in SQL. Thus, a program developing period of time can be shortened.

Each of the four embodiments has been directed to the k-nearest neighbor search method targeting points in a geographical space. However, application of this invention is not limited to the points in the geographical space. This invention can also be applied to data representable by feature vectors such as television programs or pieces of music, and similarity search can be realized. For example, in the case of television programs, serious and variety axes are set in a first feature vector while fiction and nonfiction axes are set in a second feature vector. Television programs are correlated with a two-dimensional space including those axes and, if a program of a short distance from a designated point can be searched, a television program having a similar feature can be searched.

Each of the embodiments has been described by way of example in which this invention is applied to the car navigation device 1. However, this invention can also be applied to an embedded device such as a PND, a portable phone, or a portable game machine. For the spatial database 100, points of a two-dimensional or three-dimensional space can be search targets.

Each of the embodiments has been described by way of example in which a quadtree is applied to the spatial index 101. However, other spatial indexes such as an R-tree may be applied.

Each of the embodiments has been described by way of example in which the points are represented by the coordinates in the two-dimensional space. However, this invention may be applied to points represented by multidimensional coordinates. For example, when multidimensional points are three-dimensional and locatable by one coordinate in a three-dimensional space, the points are divided into a plurality of regions by one of an octree and an R-tree of the spatial index 101, and the search processing described above can be carried out.

As described above, this invention can be applied to a computer system which uses the spatial database, especially an embedded device such as a car navigation device.

While the present invention has been described in detail and pictorially in the accompanying drawings, the present invention is not limited to such detail but covers various obvious modifications and equivalent arrangements, which fall within the purview of the appended claims.

What is claimed is:

1. A k-nearest neighbor search method of searching a database for a query number k of nearest points to a query point, the database including multidimensional points and a spatial index where a region including the points is divided into a plurality of regions to set child regions in the region, a tree structure including branches and leaf nodes being created from the points and the region,
the search method comprising:
setting the query point and the query number as search conditions;
judging whether a nearest region to the query point is a lowest branch or an intermediate branch of the spatial index;
calculating, when the nearest region is judged to be an intermediate branch having a child region, a distance between the query point and the child region of the nearest region as a region distance;
storing information on a region which has become a calculation target of the region distance to obtain a nearest region to the region;
calculating, when a result of the judging shows that the nearest region is a lowest branch having no child region, a distance between the query point and a point included in the nearest region as a point distance;
storing information on the point which has become a calculation target of the point distance;
repeating, until the search conditions are satisfied, search processing from the judging to the storing the information on the point which has become the calculation target of the point distance, and finishing the search processing when the search conditions are satisfied; and
obtaining, after finishing the search processing, a record of the stored point as a search result from a database management system for managing the database.

2. The k-nearest neighbor search method according to claim 1, wherein the spatial index manages regions into which a multidimensional space is hierarchically divided by surfaces passing through axes by a tree structure, stores information on the divided regions in branches, each of the divided regions corresponding to the branches including a divided region corresponding to a branch positioned as a child of the branch, and stores information on a point included in a divided region corresponding to the lowest branch in a leaf node adjacent to the branch.

3. The k-nearest neighbor search method according to claim 2, wherein:
the multidimensional points comprise points each being locatable by one coordinate in a two-dimensional space; and
in the spatial index, the points are divided into a plurality of regions by one of a quadtree and an R-tree.

4. The k-nearest neighbor search method according to claim 2, wherein:
the multidimensional points comprise points each being locatable by one coordinate in a three-dimensional space; and
in the spatial index, the points are divided into a plurality of regions by one of an octree and an R-tree.

5. The k-nearest neighbor search method according to claim 2, wherein:
the spatial index contains attribute information on the point in the information on the point to manage the information by a leaf node;
the setting the query point and the query number as the search conditions comprises setting the query point, the query number, and the attribute information as search conditions;
the calculating the distance between the query point and the point included in the nearest region comprises storing only points matching the attribute information of the search condition; and
the obtaining the record of the stored point as the search result from the database management system comprises obtaining k nearest points to the query point that match the attribute information.

6. The k-nearest neighbor search method according to claim 2, wherein the setting the query point and the query number as the search conditions comprises receiving a coordinate column name, the query point and the query number of a table of the database which becomes a search target as arguments in one of a language and a function.

7. The k-nearest neighbor search method according to claim 2, wherein:
the initial setting manager sets the query point, the query number, and an interruption condition as search conditions, and interrupts, even in a situation where the query number is not reached, the search processing if the interruption condition is satisfied; and
the result manager is capable of obtaining up to k nearest points to the query point.

8. The k-nearest neighbor search method according to claim 7, wherein:
the interruption condition is described by a query distance indicating a maximum distance of points which become a search result;

the region distance calculator records only information on divided points having distances equal to or shorter than the query distance in the region manager;

the point distance calculator records only information on points having distances equal to or shorter than the query distance in the point manager; and the result manager is accordingly capable of obtaining up to k nearest points to the query point that have distances equal to or shorter than the query distance from the database management system.

9. The k-nearest neighbor search method according to claim 7, wherein:

the interruption condition is described by maximum processing time indicating maximum time expended for the search processing;

the search processing is interrupted when an elapsed execution time of the search processing becomes equal to the maximum processing time; and the result manager obtains up to k nearest points to the query point from the database management system.

10. The k-nearest neighbor search method according to claim 7, wherein the k-nearest neighbor search executed in the database management system is describable by one of a query language and function that takes a coordinate column name, the query point, the query number, the attribute information and the maximum processing time of a table which becomes a search target as arguments.

11. The k-nearest neighbor search method according to claim 2, wherein:

the initial setting manager sets the query point, the query number, attribute information and an interruption condition as search condition;

the point distance calculator records only points matching the attribute information of the search conditions in the point manager;

even in a situation where the query number is not reached, the search processing is interrupted if the interruption condition is satisfied; and the result manager obtains up to k points matching the attribute information from the database management system.

12. The k-nearest neighbor search method according to claim 11, wherein:

the interruption condition is described by a query distance indicating a maximum distance of points which become a search result;

the region distance calculator records only information on divided points having distances equal to or shorter than the query distance in the region manager;

the point distance calculator records only information on points having distances equal to or shorter than the query distance in the point manager; and the result manager is accordingly capable of obtaining up to k nearest points to the query point that match the attribute information and have distances equal to or shorter than the query distance from the database management system.

13. The k-nearest neighbor search method according to claim 11, wherein:

the interruption condition is described by maximum processing time indicating maximum time expended for the search processing;

the search processing is interrupted when an elapsed execution time of the search processing becomes equal to the maximum processing time; and the result manager obtains up to k nearest points to the query point that match the attribute information and have distances equal to or shorter than the query distance from the database management system.

14. The k-nearest neighbor search method according to claim 1, wherein the calculating the distance between the query point and the child region of the nearest region comprises obtaining, for the distance between the query point and the child region, a distance between the query point and a point nearest to the query point among points on a boundary line of the child region as a region distance, and setting the region distance to 0 when the child region includes the query point.

15. The k-nearest neighbor search method according to claim 14, wherein the obtaining the nearest region to the region comprises storing, as pieces of information on the region, a region pointer indicating a storing position of information on one of a region and a child region in the database management system and the region distance of the region, selecting information on the nearest region which becomes a judging target of the judging which of the lowest branch and the intermediate branch of the spatial index the nearest region is, and then deleting the region.

16. The k-nearest neighbor search method according to claim 15, wherein the region manager manages the information on the divided regions by a heap structure, and sets a heap condition for the heap structure that a region distance of a divided region corresponding to a node of the heap structure is equal to or shorter than a region distance of a divided region corresponding to a child of the node.

17. The k-nearest neighbor search method according to claim 16, wherein the k-nearest neighbor search executed in the database management system is describable by one of a query language and function that takes a coordinate column name, the query point, the query number and maximum processing time of a table which becomes a search target as arguments.

18. The k-nearest neighbor search method according to claim 14, wherein the calculating the distance between the query point and the point included in the nearest region comprises defining a shortest distance between the query point and the point as the point distance, and calculating the point distance.

19. The k-nearest neighbor search method according to claim 18, wherein the storing the information on the point which has become the calculation target of the point distance comprises deleting, in a case of storing, as pieces of information on the point for up to k points, a pointer indicating a storage position of the point in the database management system and a point distance, and storing a point for which point distance calculation is finished when pieces of information on k points are already stored, a piece of information on a point having a longest point distance among k+1 points, and storing pieces of information on remaining k points.

20. The k-nearest neighbor search method according to claim 18, wherein the finishing the search processing comprises finishing the search processing when a shortest region distance among regions stored in the storing the information on the region which has become the calculation target of the region distance is longer than a longest point distance among points stored in the storing the information on the point which has become the calculation target of the point distance.

21. The k-nearest neighbor search method according to claim 20, wherein the point manager manages the information on the points by a heap structure, and sets a heap condition for the heap structure that a point distance of a point corresponding to a node of the heap structure is equal to or longer than a point distance of a point corresponding to a child of the node.

22. The k-nearest neighbor search method according to claim 21, wherein the termination checker finishes the search processing when a region distance of a divided point positioned in a root of the heap structure of the region manager is longer than a point distance of a point positioned in a root of the heap structure of the point manager.

23. The k-nearest neighbor search method according to claim 22, wherein the k-nearest neighbor search executed in the database management system is describable by one of a query language and function that takes a coordinate column name, the query point, the query number, the attribute information and a query distance of a table which becomes a search target as arguments.

24. The k-nearest neighbor search method according to claim 21, wherein the k-nearest neighbor search executed in the database management system is describable by one of a query language and function that takes a coordinate column name, the query point, the query number, attribute information and an interruption condition of a table which becomes a search target as arguments.

25. A non-transitory storage medium storing a program for receiving a query point which becomes a search start point and searching for a query number k of nearest points to the query point in a database including multidimensional points and a spatial index where a region including the points is divided into a plurality of regions to set child regions in the region, and a tree structure including branches and leaf nodes is created from the points and the region, and a database management system for managing the database, the program controlling a computer to execute:

setting the query point and the query number as search conditions;

judging which of a lowest branch and an intermediate branch of the spatial index a nearest region to the query point is;

calculating, when the nearest region is judged to be the intermediate branch having a child region, a distance between the query point and the child region of the nearest region as a region distance;

storing information on a region which has become a calculation target of the region distance to obtain a nearest region to the region;

calculating, when a result of the judging which of the lowest branch and the intermediate branch shows that the nearest region is the lowest branch having no child region, a distance between the query point and a point included in the nearest region as a point distance;

storing information on the point which has become a calculation target of the point distance;

repeating, until the search conditions are satisfied, search processing from the judging which of the lowest branch and the intermediate branch of the spatial index the nearest region to the query point is to the storing the information on the point which has become the calculation target of the point distance, and finishing the search processing when the search conditions are satisfied; and obtaining, after the finishing the search processing, a record of the stored point as a search result from the database management system.

26. A k-nearest neighbor search device for receiving a query point which becomes a search start point and searching for a query number k of nearest points to the query point, comprising:

a processor for performing calculation processing;

a storage device for storing information;

a database including multidimensional points and a spatial index where a region including the points is divided into a plurality of regions to set child regions in the region and a tree structure including branches and leaf nodes is created from the points and the region;

a database management system for managing the database;

an initial setting manager for setting the query point and the query number as search conditions by the processor;

a lowest branch checker for judging which of a lowest branch and an intermediate branch of the spatial index a nearest region to the query point is by the processor;

a region distance calculator for calculating, when the nearest region is judged to be the intermediate branch having a child region, a distance between the query point and the child region of the nearest region as a region distance by the processor;

a region manager for storing information on a region which has become a calculation target of the region distance to obtain a nearest region to the region by the processor;

a point manager for calculating, when a result of the judging which of the lowest branch and the intermediate branch shows that the nearest region is the lowest branch having no child region, a distance between the query point and a point included in the nearest region as a point distance by the processor;

a point distance calculator for storing information on the point which has become a calculation target of the point distance in the storage device by the processor;

a termination checker for repeating, until the search conditions are satisfied, search processing from the lowest branch checker to the point manager, and finishing the search processing when the search conditions are satisfied by the processor; and a result manager for obtaining, after the finishing the search processing, a record of the stored point as a search result from the database management system by the processor.

27. The k-nearest neighbor search device according to claim 26, wherein:

the initial setting manager sets the query point, the query number, and an interruption condition as search conditions;

the termination checker interrupts, even in a situation where the query number is not reached, the search processing when the interruption condition is satisfied; and the result manager obtains up to k nearest points to the query point.

28. The k-nearest neighbor search device according to claim 27, wherein:

the interruption condition includes any one of a query distance indicating a longest distance from the query point to the point and maximum processing time indicating maximum time expended for the search processing;

if the interruption condition is the query distance, the region distance calculator stores only information on divided regions having distances equal to or shorter than the query distance in the region manager;

the point distance calculator stores only information on points having distances equal to or shorter than the query distance in the point manager; and the result manager obtains up to k nearest points to the query point that have distances equal to or shorter than the query distance from the database management system; and if the interruption condition is the maximum processing time, the termination checker interrupts the search processing when elapsed time of the search processing becomes equal to the maximum processing time; and the result manager obtains up to k nearest points to the query point from the database management system.

29. The k-nearest neighbor search method according to claim 28, wherein the k-nearest neighbor search executed in the database management system is describable in one of a query language and function that takes a coordinate column name, the query point, the query number and a query distance of a table which becomes a search target as arguments.

30. The k-nearest neighbor search method according to claim 27, wherein the k-nearest neighbor search executed in the database management system is describable in one of a query language and function that takes a coordinate column name, the query point, the query number and an interruption condition of a table which becomes a search target as arguments.

31. The k-nearest neighbor search method according to claim 26, wherein the k-nearest neighbor search executed in the database management system is describable in one of a query language and function that takes a coordinate column name, the query point, the query number and attribute information of a table which becomes a search target as arguments.

* * * * *